(12) United States Patent
Bordin

(10) Patent No.: US 9,155,986 B2
(45) Date of Patent: Oct. 13, 2015

(54) AIR FILTRATION UNIT

(71) Applicant: Bordin Racing Limited, Woodbridge (CA)

(72) Inventor: Andrew Bordin, Woodbridge (CA)

(73) Assignee: Bordin Racing Limited, Woodbridge, ON (CA)

(*) Notice: Subject to any disclaimer, the term of this patent is extended or adjusted under 35 U.S.C. 154(b) by 42 days.

(21) Appl. No.: 13/950,484

(22) Filed: Jul. 25, 2013

(65) Prior Publication Data

US 2013/0305670 A1 Nov. 21, 2013

Related U.S. Application Data

(63) Continuation-in-part of application No. 13/588,602, filed on Aug. 17, 2012, now Pat. No. 8,496,720, which is a continuation of application No. 12/656,856, filed on Feb. 18, 2010, now Pat. No. 8,246,703.

(51) Int. Cl.
| | |
|---|---|
| *B01D 46/00* | (2006.01) |
| *F24F 13/18* | (2006.01) |
| *F24F 13/28* | (2006.01) |
| *B01D 46/10* | (2006.01) |
| *F24F 3/16* | (2006.01) |

(52) U.S. Cl.
CPC ............ *B01D 46/0002* (2013.01); *F24F 13/18* (2013.01); *F24F 13/28* (2013.01); *B01D 46/0005* (2013.01); *B01D 46/10* (2013.01); *F24F 2003/1614* (2013.01)

(58) Field of Classification Search
CPC .............. B01D 46/00; E06B 3/00; E06B 9/01
USPC ....... 55/385.1, 385.2, 471, DIG. 18; 454/195, 454/187, 181, 238, 239, 259; 49/504; 52/204.1, 216
See application file for complete search history.

(56) References Cited

U.S. PATENT DOCUMENTS

| | | | | |
|---|---|---|---|---|
| 5,099,751 | A * | 3/1992 | Newman et al. .............. | 454/238 |
| 5,725,622 | A * | 3/1998 | Whitson et al. .............. | 55/385.4 |
| 6,383,241 | B1 * | 5/2002 | Janus et al. .................. | 55/385.2 |
| 6,749,499 | B1 * | 6/2004 | Snyder ......................... | 454/289 |
| 8,246,703 | B2 * | 8/2012 | Bordin ......................... | 55/385.2 |
| 8,496,720 | B2 * | 7/2013 | Bordin ......................... | 55/385.2 |
| 2004/0065029 | A1 * | 4/2004 | Morris ......................... | 52/204.5 |

* cited by examiner

*Primary Examiner* — Duane Smith
*Assistant Examiner* — Minh-Chau Pham

(57) ABSTRACT

An air filter system and an air filter therefore are provided for use in a building with first and second zones separated by a wall-door system having a wall with a door therein. The gap between a lower edge of the door and the floor has an air flow permitting region. An air filter is mounted to extend substantially across the air flow permitting region. In a preferred embodiment the air filter extends across a lower edge of a door and filters air that passes below the lower door edge and a portion of the floor below the lower edge.

24 Claims, 16 Drawing Sheets

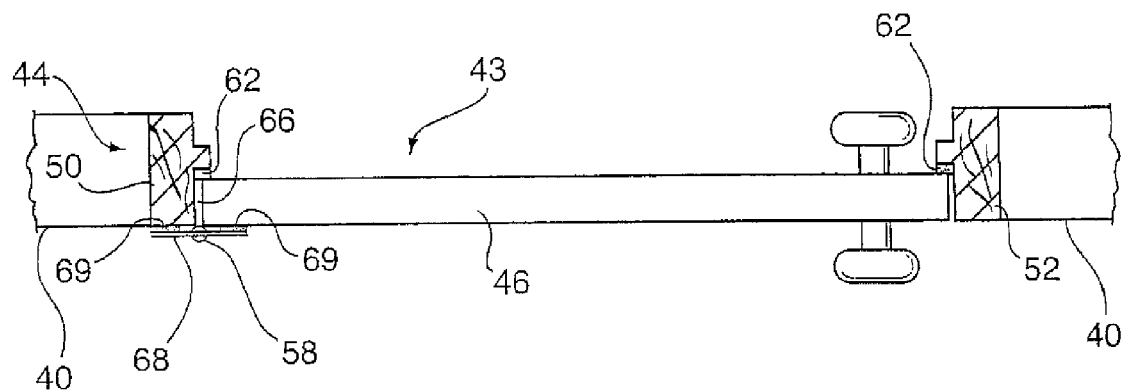
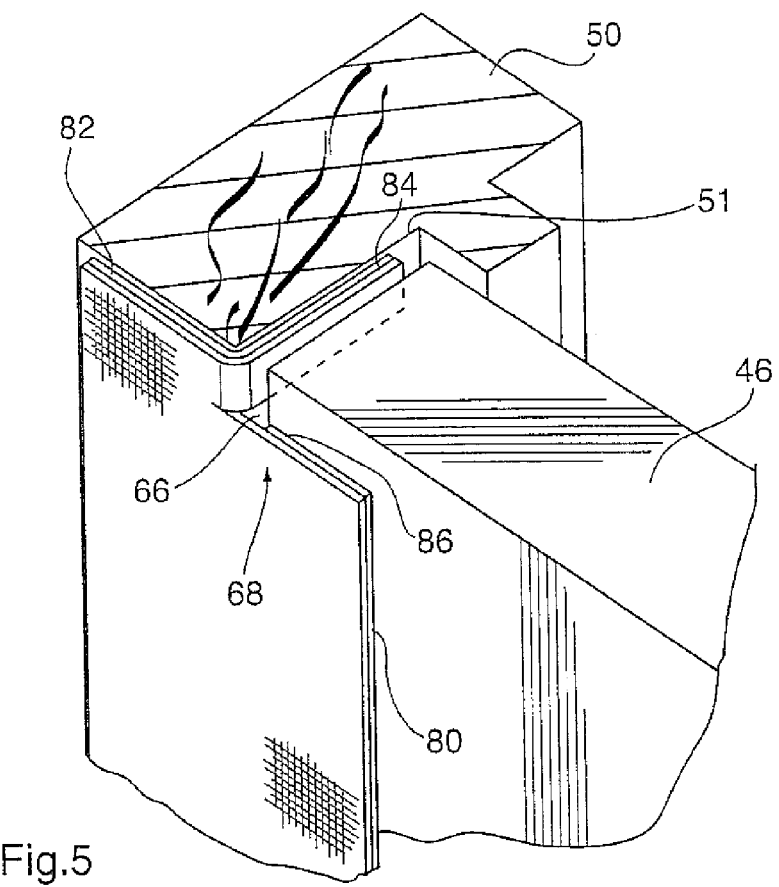

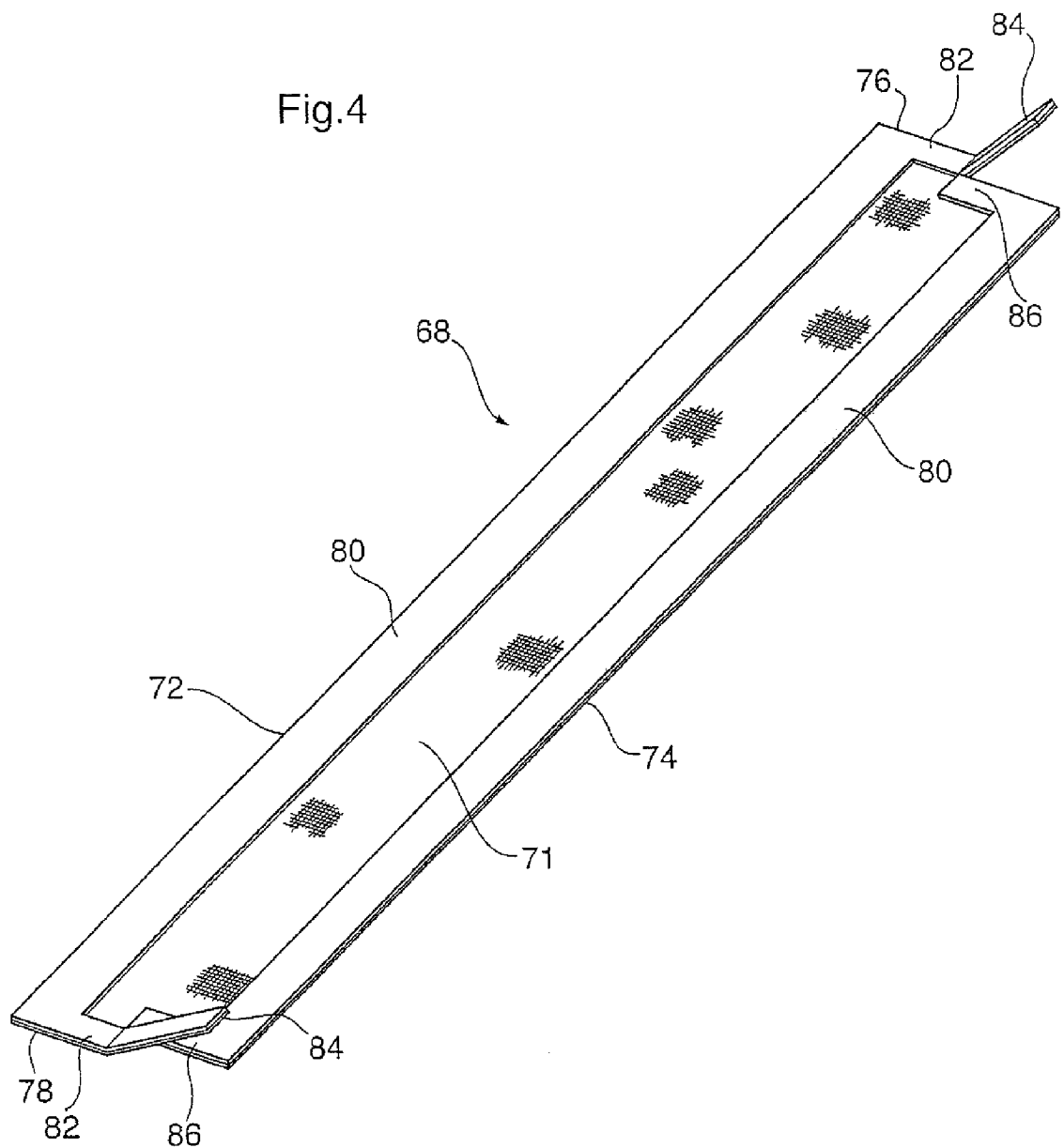

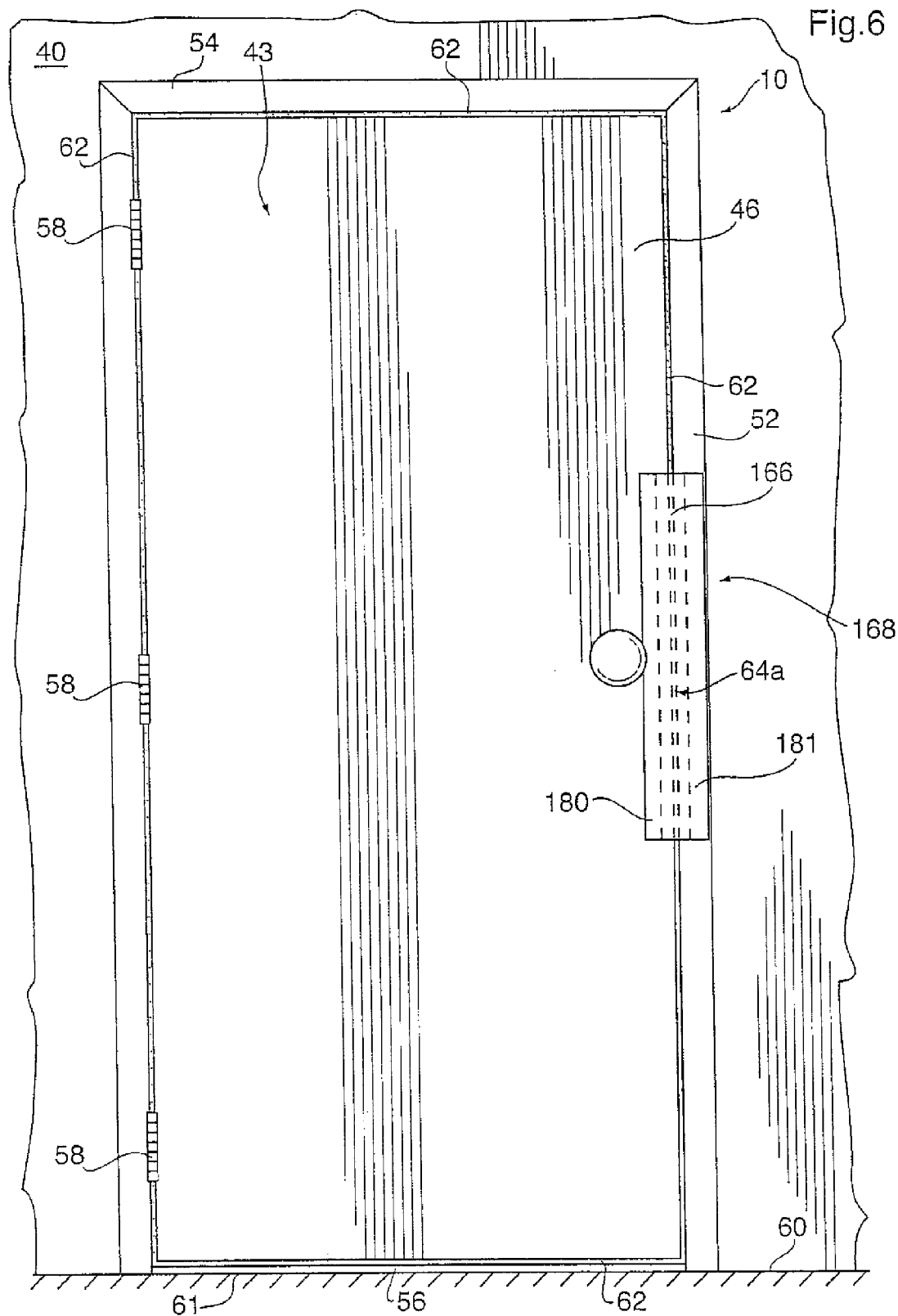

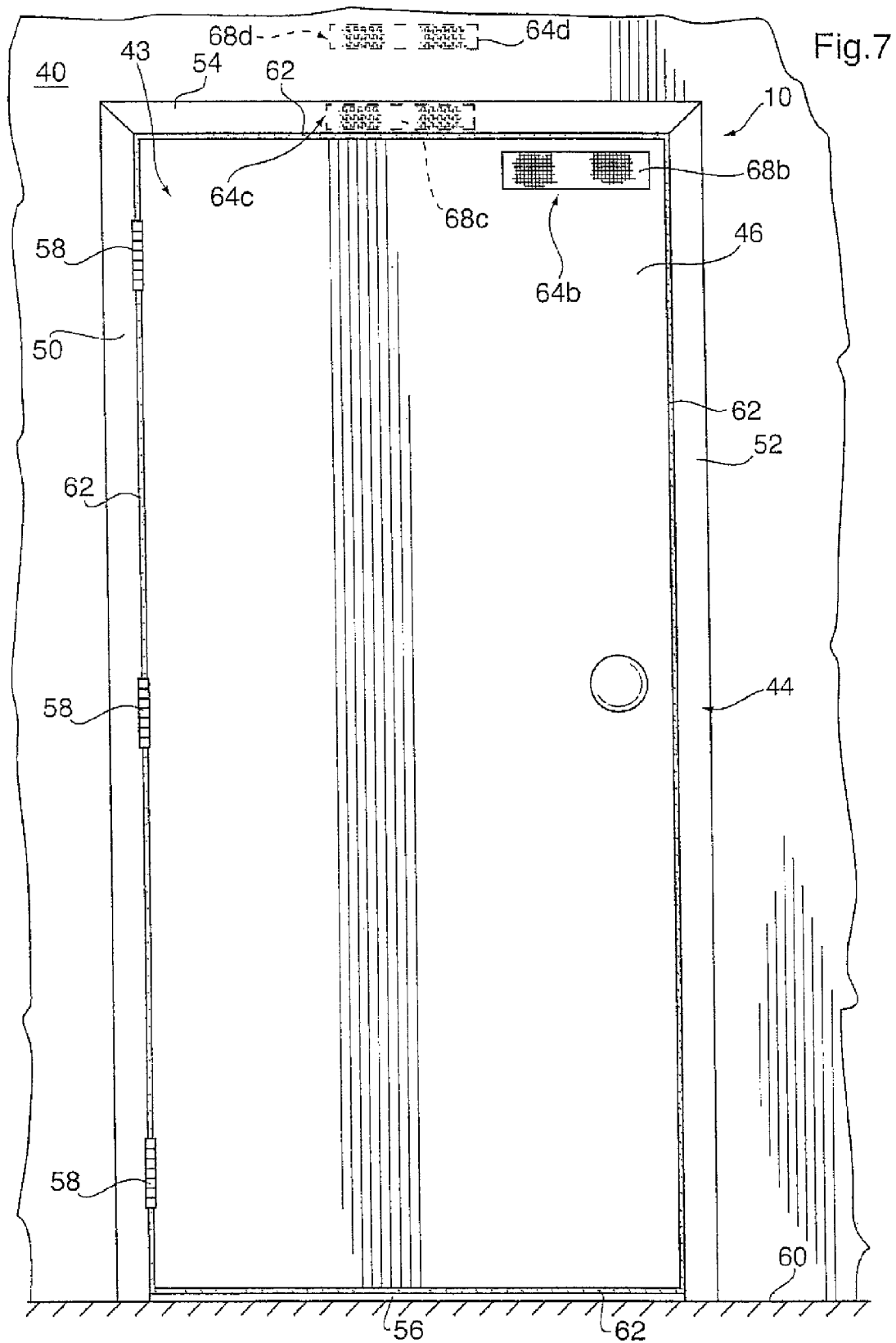

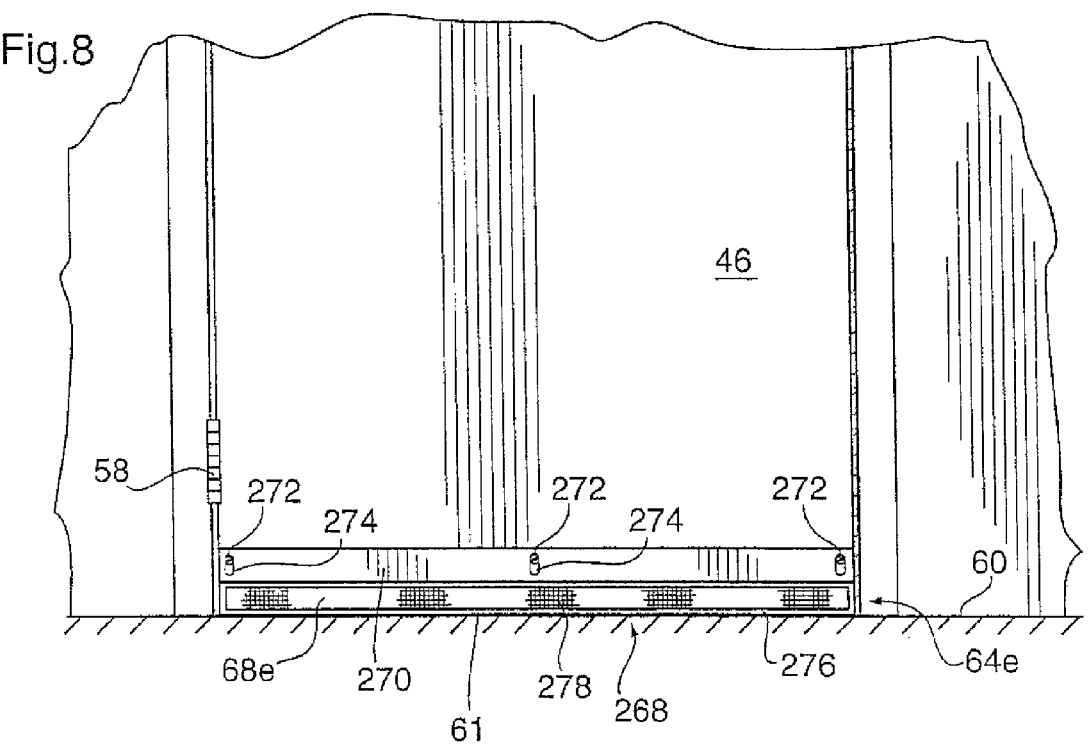
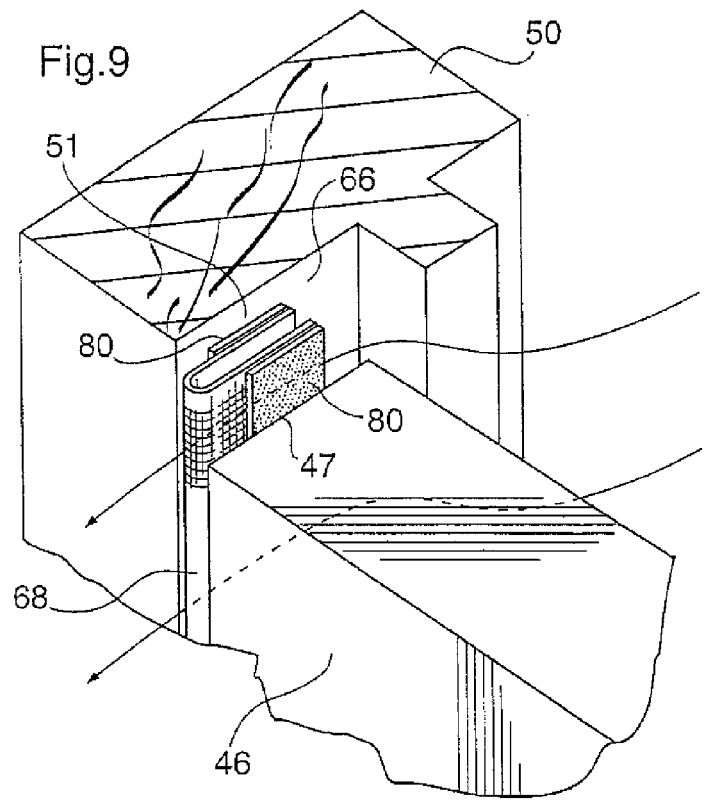

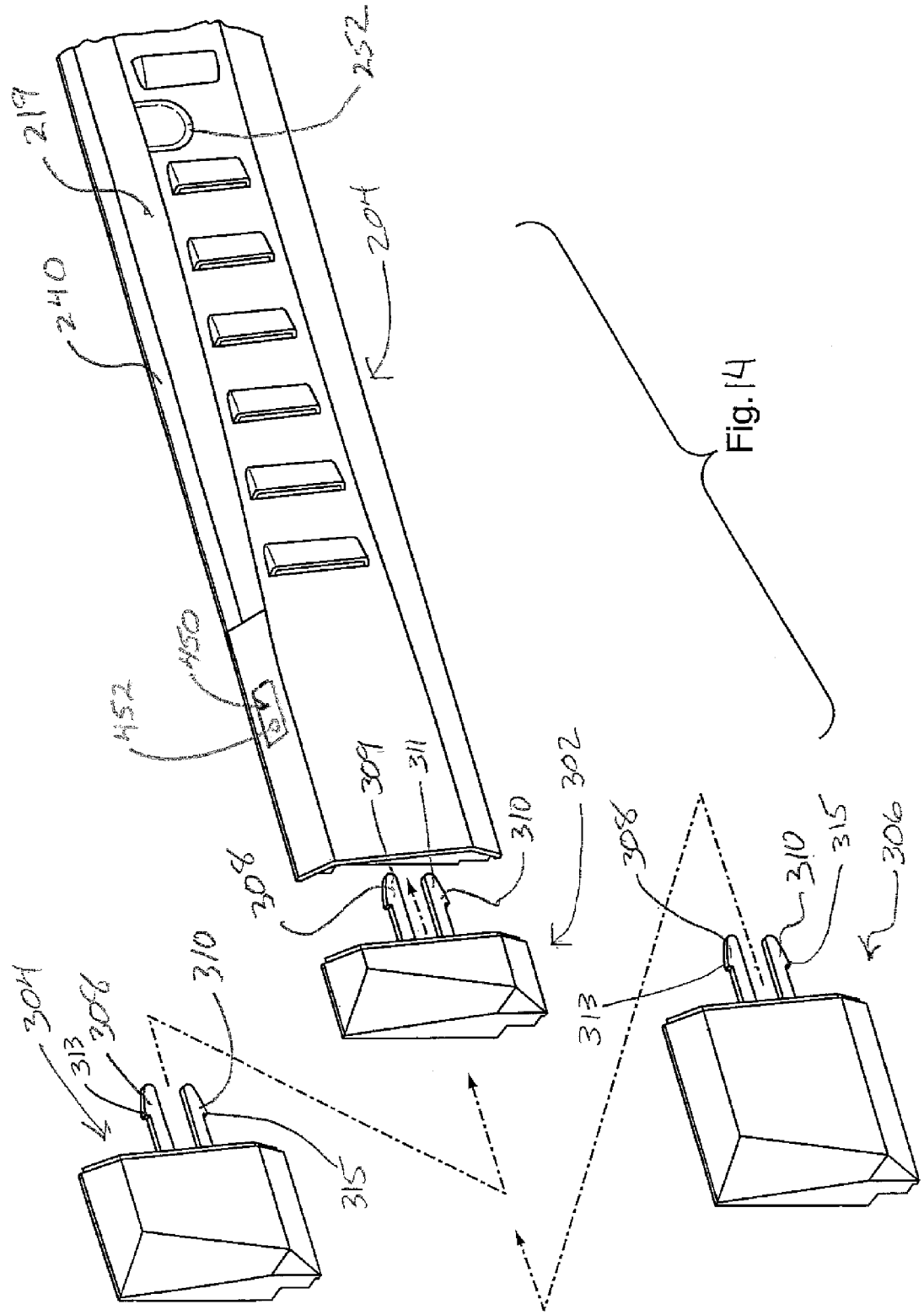

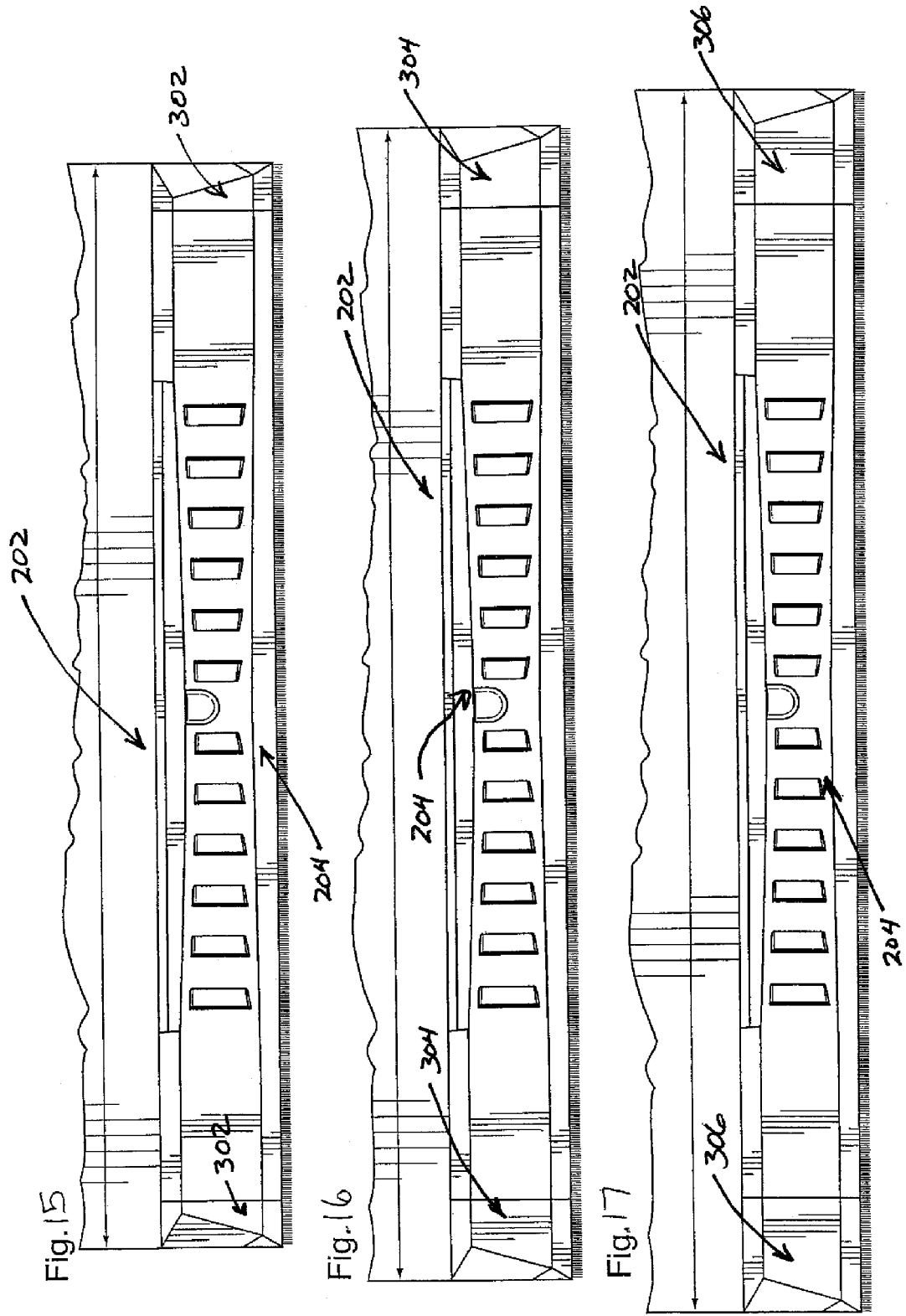

AIR FILTRATION UNIT

This application is a continuation-in-part of U.S. application Ser. No. 13/588,602, filed Aug. 17, 2012, now U.S. Pat. No. 8,496,720 B2, which is a continuation of U.S. application Ser. No. 12/656,856, filed Feb. 18, 2010, now U.S. Pat. No. 8,246,703 issued Aug. 21, 2012 both of which are incorporated herein by reference.

FIELD OF THE INVENTION

The present invention relates to air filters and in particular relates to air filters designed to filter air passing to the exterior of a peripheral edge of a door.

BACKGROUND OF THE INVENTION

It is known to subject large buildings, such as commercial office buildings or high rise hotel, apartment or condominium buildings, to positive air pressure relative to outside atmospheric pressure. An important reason for such pressurization is to reduce or eliminate air infiltration into a building through open or leaking doors or windows or otherwise through the building's exterior envelope. Such infiltering air, which bypasses the building's heating, ventilation and air conditioning or air handling ("HVAC") systems, can lead to indoor air quality problems, arising from undesirable contaminants and moisture carried by the infiltering air. Uncontrolled moisture in particular can be problematic, for example leading to damage of building components or to development of mold or mildew. Positive pressurization of the building reduces such problems.

Typically, to establish and maintain a positive pressure inside the building, air is blown by a fan into central interior portions of the building, thereby creating a high pressure zone relative to outside atmospheric pressure. As a result, an air pressure gradient is established across the building from the central portions of the building across the building envelope to the exterior. Air will tend to flow from zones of higher pressure to zones of lower pressure, following the gradient and at a rate dependent on the tightness of the building envelope, of In a typical office or high rise residential building, such as an apartment or a condominium building, the higher pressure air is introduced into the common areas (e.g. hallways, corridors, elevator lobbies) which are typically located in the central core area of the building. The individual office or residential units or suites are usually clustered around the central core so as to afford each unit access to, or views of; the exterior.

The individual units are separated from the common areas and from each other by walls made (for obvious security, safety e.g. fire and smoke, noise, privacy and other reasons) of highly robust materials. For example, such walls may be made of concrete blocks, concrete panels or poured concrete. In most cases, such walls will be finished on both sides, for example by paint or by rigid sheet materials (e.g. taped and painted drywall or gypsum board). Typically, such wall structures comprise air flow barriers which are highly resistant or essentially impermeable to the flow of air therethrough.

Other common building materials which, if joints and seams are sealed, may also act as air barriers in a wall include sheathing materials such as plywood or oriented strand board (OSB), supported flexible barriers (e.g. polyethylene sheets), properly applied specialty air barrier compositions, rigid sheet insulation, glass blocks, sheets of glass and unperforated housewraps.

Some building materials, while resisting airflow therethrough, may nevertheless allow some air to pass. Examples may include some housewraps, felt papers and spray cellulose. Such materials may be known as air flow retarders.

Access from the common areas to the individual units is achieved through doorways in the wall. Door frames (consisting of two side jambs, a head jamb and possibly a sill or threshold) are installed in the doorway openings. Again, for security and other reasons, the door frames are typically made of highly robust materials, such as steel, and are solidly mounted to the wall.

The doors, mounted on hinges to the door frames, are also of made of highly robust materials, such as steel or heavy wood panels and possibly with cores of insulation. Such door paneling materials also typically are air flow barriers.

In buildings with the above structures, the pressurized air in the common areas, being unable to flow through the walls into the individual units, can only flow through the doorways. When the doors are closed, which typically would be most of the time, the air may only flow into the units around the edges of the doors, namely between the side edges of the door and the side jambs of the door frame, between the upper edge of the door and the head jamb of the door frame and between the lower edge of the door and the sill or threshold (if there is one) of the door frame or the floor itself (if there is no sill or threshold).

Although the structures described above are adequate to prevent or reduce problems of infiltration into the building of untreated outside air, they do not in any way address, let alone solve, problems associated with the flow of air along the pressure gradient from one zone of the building to another. In particular, they do not address the problems associated with air flow from the common areas into the individual units.

For example, regardless of the fact that dirt and other contaminants may not be brought into the building by means of air infiltration, dirt and other contaminants are nevertheless present due to generation within the building or being brought into the building by various means. For example, residual dust and dirt may be present from the original building construction. In addition, dust and dirt will be brought into the building by people entering the building or may enter the building through open doors and windows. Dust and dirt may also be generated during building repairs or the innumerable activities of people inside the building. In addition, people and their pets are organic beings which constantly shed biological materials, such as dried skin and hair. All of these and other contaminants may be present in the form of airborne dust or other heavier particulates capable of being moved by flowing air.

Especially because the common areas of the building will typically have more traffic than individual units, a significant amount of dust and dirt can be present in the common areas. Some of that dust and dirt is entrained in the air in the common areas which then flows from the common areas into the units, as described above.

In this manner, contaminants are moved from one zone of the building to another by means of the air flow described above. The air flow beneath a door in many cases is quite considerable particularly if the gap is not interrupted by a threshold beneath the door.

There is thus a need for a structure which will reduce or eliminate the movement of dirt, dust and other contaminants from a pressurized zone of a building into an adjacent zone of the building.

SUMMARY OF THE INVENTION

The present invention is directed to an air filter system for a door system separating first and second air pressure zones.

The door system includes a door frame having an air flow barrier door generally sized to fit within and hinged to the door frame. The door has two side edges and upper and lower edges with an air flow permitting region between the lower edge of the door and a door threshold when the door is closed. The air filter system includes an air filter housing attached to and extending downwardly below the lower edge of the door. The air filter housing includes an air inlet adjacent the lower edge of the door and an air outlet spaced outwardly to one side of the door with an air filter member separating the air inlet from the air outlet that filters air passing through the air inlet to the air outlet.

In an aspect of the invention the air filter housing extends downwardly from an inside face of the door and includes a floor engaging seal along a lower edge thereof.

In a further aspect of the invention, the air filter housing extends across the width of the door and is adhesively attached to an inside face of the door.

In yet a further aspect of the invention, the filter member is removably received in the air filter housing.

An air filter for filtering air flowing through a gap between a lower edge of a door and a door floor region according to one aspect of the invention includes a base portion and a frame portion with the base portion being attachable to the lower edge of the door. The frame portion extends downwardly to substantially extend across the gap and seals with the floor region. The frame portion includes a frame opening, and air filter material substantially extends across the frame opening.

In another aspect, the present invention is directed to a method of filtering air in a building having a first zone and a second zone separated by a wall and having a door system in the wall, the first and second zones having an air pressure differential therebetween; the door system including a door frame mounted in the wall, a door generally sized to fit within the door frame, the door being hinged along one side to a side jamb of the door frame; the door system having an air flow gap between a floor and a lower edge of the door, the method comprising: the steps of attaching an air filter system to the door at the lower edge and extending downwardly below the door and generally sealing with the floor whereby air flow passing through the air flow gap is filtered by the air flow system. This arrangement allows an air flow but filters the air prior to entering the second zone.

An air filter unit according to the present invention comprises a housing securable to a lower edge of a door with the housing having a front face, a rear face and a bottom edge including a floor engaging air block member. An air filter is provided in the housing and separates an air inlet structure located adjacent a lower edge of the rear face and an air outlet in the front face. The air inlet cooperates with the housing and the floor engaging air blocking member to define an air channel that directs air passing through the air inlet upwardly to and through the air filter and subsequently discharged from the housing through the air outlet. Preferably the air filter unit uses a replaceable air filter member that is releasably retained within the housing.

In a further aspect of the invention, the housing is securable to the lower edge of the door by means of an adhesive structure such that the integrity of the face of the door is maintained. Mechanical fastener securement of the air filter unit to a door is also possible but may not comply with specific condominium or leased office space regulations.

In a further aspect of the invention the air filter unit includes a series of end caps of different lengths which can be selectively secured to a body member of the air filter structure to vary a length of the overall air filter. In this way the length of the air filter unit can be selected at the time of installation to generally correspond to the particular width of the door.

A door filter unit according to a different aspect of the invention comprises an elongate housing having a front and rear face with the housing being securable to a planar face of a door. The rear face of the housing includes an air inlet portion extending below a bottom edge of the door to receive and redirect air passing below the bottom edge. The housing includes an upwardly extending distribution chamber of a size to at least partially overlap when secured to the planar face of a door. The air distribution chamber connects the air inlet portion to an air outlet portion. The door filter further includes an air filter separating the distribution chamber from the air outlet portion such that air passing from the air inlet to the air distribution chamber and out the air outlet portion passes through the air filter.

According to an aspect of the invention the housing is of a length to extend generally across the bottom edge of the door.

In yet a further aspect of the invention the air filter is a removable air filter cartridge and the housing includes a pocket for receiving and retaining the air filter cartridge.

According to a further aspect of the invention the air filter pocket is upwardly opening and the air filter cartridge is upwardly removable from the housing.

In a different aspect of the invention the air distribution chamber is oversized relative to a net filtering surface of the air filter.

BRIEF DESCRIPTION OF THE DRAWINGS

Preferred embodiments of the present invention are illustrated in the attached drawings, in which:

FIG. 3 is a cross-section of the wall-door system of FIG. 2, along the line A-A thereof;

FIG. 4 is a perspective view of a preferred embodiment of a filter according to the invention;

FIG. 5 is a close-up cut-away perspective detail showing the attachment of the filter of FIG. 4 to the wall-door system;

FIG. 6 is an elevation view of a wall-door system, showing the door in its closed position, according to an alternate embodiment of the invention;

FIG. 7 is an elevation view of a wall-door system, showing the door in its closed position, according to three alternate embodiments of the invention;

FIG. 8 is an elevation view of the lower portion of a wall-door system, showing the door in its closed position, according to yet a further alternate embodiment of the invention;

FIG. 9 is a close-up view of a further alternate embodiment of the invention,

FIG. 14 is a partial perspective view showing a body portion of the housing and a choice of three end members securable to the housing to extend the length of the air filter unit;

FIGS. 15, 16 and 17 illustrate the different end caps securable to the air filter housing to accommodate different door widths;

DETAILED DISCLOSURE

Figure 1:
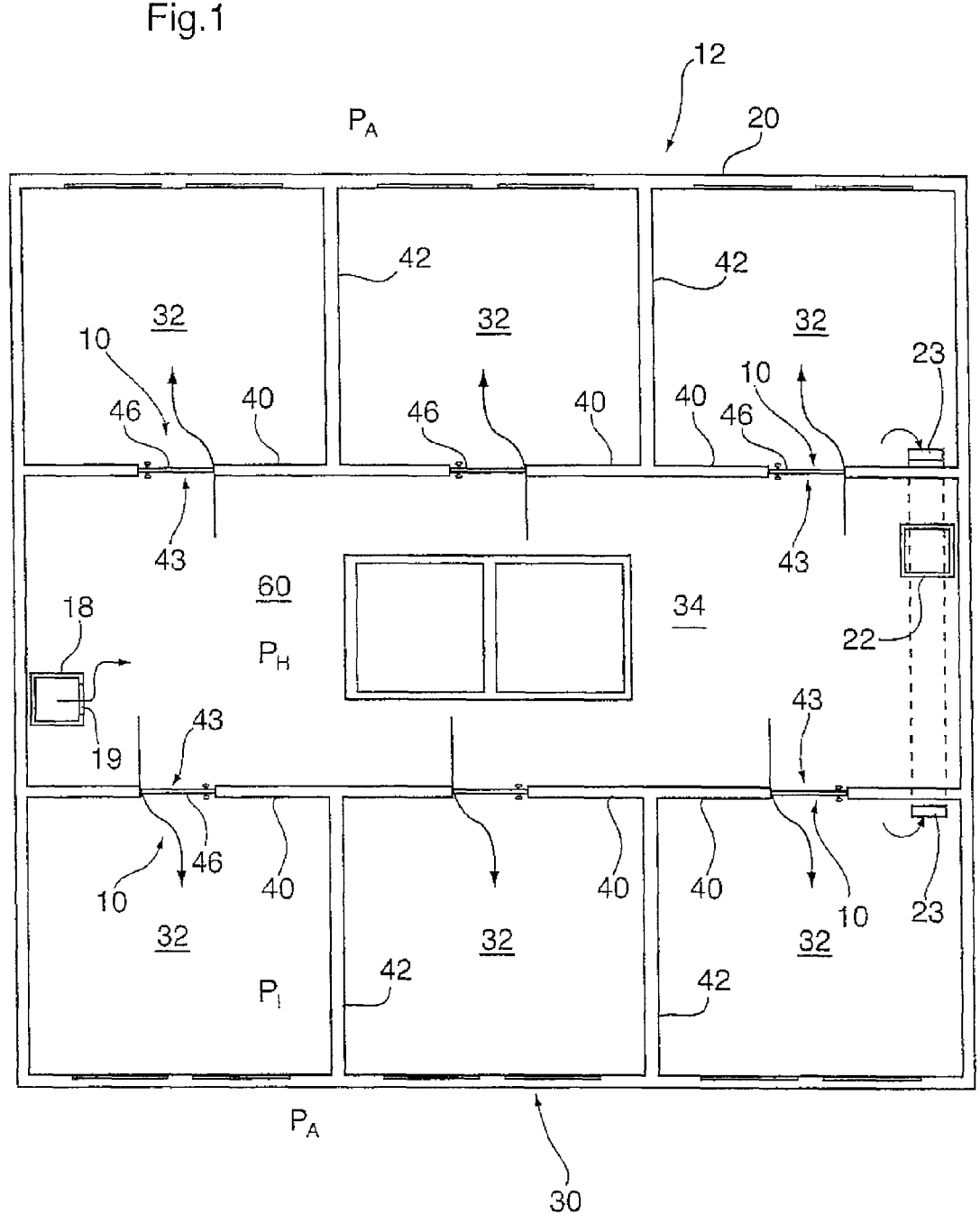
FIG. 1 is a plan view of a floor of a building which incorporates the invention.

Referring to FIG. 1, there is generally shown a representative floor 30 of a multi-level or high-rise building 12 in which the air filter system of the invention, generally shown as 10, is used in several units 32 of building 12. Building 12 may be a commercial or a residential building. Units 32 may be individual offices or residential units, such as apartment or condominium units or hotel suites.

Building 12 has a heating, ventilating and air conditioning (HVAC) system (not shown) to receive recirculated inside air, to take in some outside air and mix it with recirculated air, to condition the air (e.g. by filtering, heating or cooling to a desired temperature and humidifying or dehumidifying to a desired level) and to distribute it throughout the building by a supply duct system 18. For energy efficiency reasons, used air will typically be collected for recirculation and returned to the HVAC system through a return air duct system 22.

The HVAC system will include a blower (not shown) to supply air at a pressure $P_H$, somewhat higher than outside atmospheric pressure $P_A$, through inlet vents 19 to interior portions of building 12.

In a modern well-sealed building, the exterior building envelope 20 can be expected to be, through the use of suitable barrier materials (for example such as those mentioned above), reasonably impermeable to the flow of both air and water across or through the building envelope. Particularly in such well-sealed buildings, to allow for adequate ventilation, HVAC system 14 must take in an appropriate amount of fresh outside air and, so as to balance same, may have to exhaust a certain amount of used inside air. In such buildings, individual units 32 can be expected to be connected through outlet vents 23 to the return air duct system 22 and possibly also connected to the supply system 18 (connections not shown).

In older buildings, building envelope 20 may allow substantial airflow therethrough and, although such buildings may be relatively energy inefficient, there may be less concern about adequate ventilation.

As noted, an air filter system 10 according to the invention is shown in connection with several individual units 32 on floor 30. Floor 30 has a central common area 34, consisting of corridors, hallways, elevator lobby areas, common rooms and the like, which would be used by the various occupants and their visitors as they move to and from their particular units 32, for example en route to elevators, stairways, common rooms or other common spaces pertinent to the particular building.

The common area 34 is separated from the individual units 32 by a wall 40. Wall 40 is constructed of such materials and structural components so as to constitute an air barrier, namely so as to be substantially resistant to the flow air therethrough when subjected to a modest pressure differential on each side thereof. Typical materials may include concrete blocks, concrete panels, poured concrete and the like, faced with such surface treatments as may be necessary or desired, both on the interior side of wall 40 inside unit 32 or on the exterior side thereof in common area 34.

In some cases, particularly where security, fire, safety, noise or privacy concerns may be less, less robust or other types of wall construction may be adequate. For example, stud frame walls faced with drywall or plywood, if sealed at the joints, may act as an air barrier structure. Glass walls, made of sheet glass or glass blocks, with all joints sealed, may also act as an effective air barrier.

Walls 42 separate one unit 32 from neighboring units 32 and may be of similar construction to wall 40 but in any event preferably will constitute an air barrier between the units 32.

Walls 40 and 42 are supported by and on the physical floor 60. Preferably, walls 40 and 42 are sealingly attached to the floor 60 to ensure that air cannot flow under the walls, i.e. between the walls 40 or 42 and the floor 60. Similarly, preferably walls 40 and 42 are sealingly attached to ceiling structure 63 (shown in FIG. 2) to ensure that air cannot flow over the walls, i.e. between the walls 40 or 42 and the ceiling 63. Floor 60 and ceiling 63 preferably constitute air barriers.

Walls 40 have door openings 43 therein to allow access to a unit 32 from common area 34. The portion of floor 60 in the area of a door opening 43 constitutes a door threshold region 61 (shown in FIG. 2).

Figure 2:
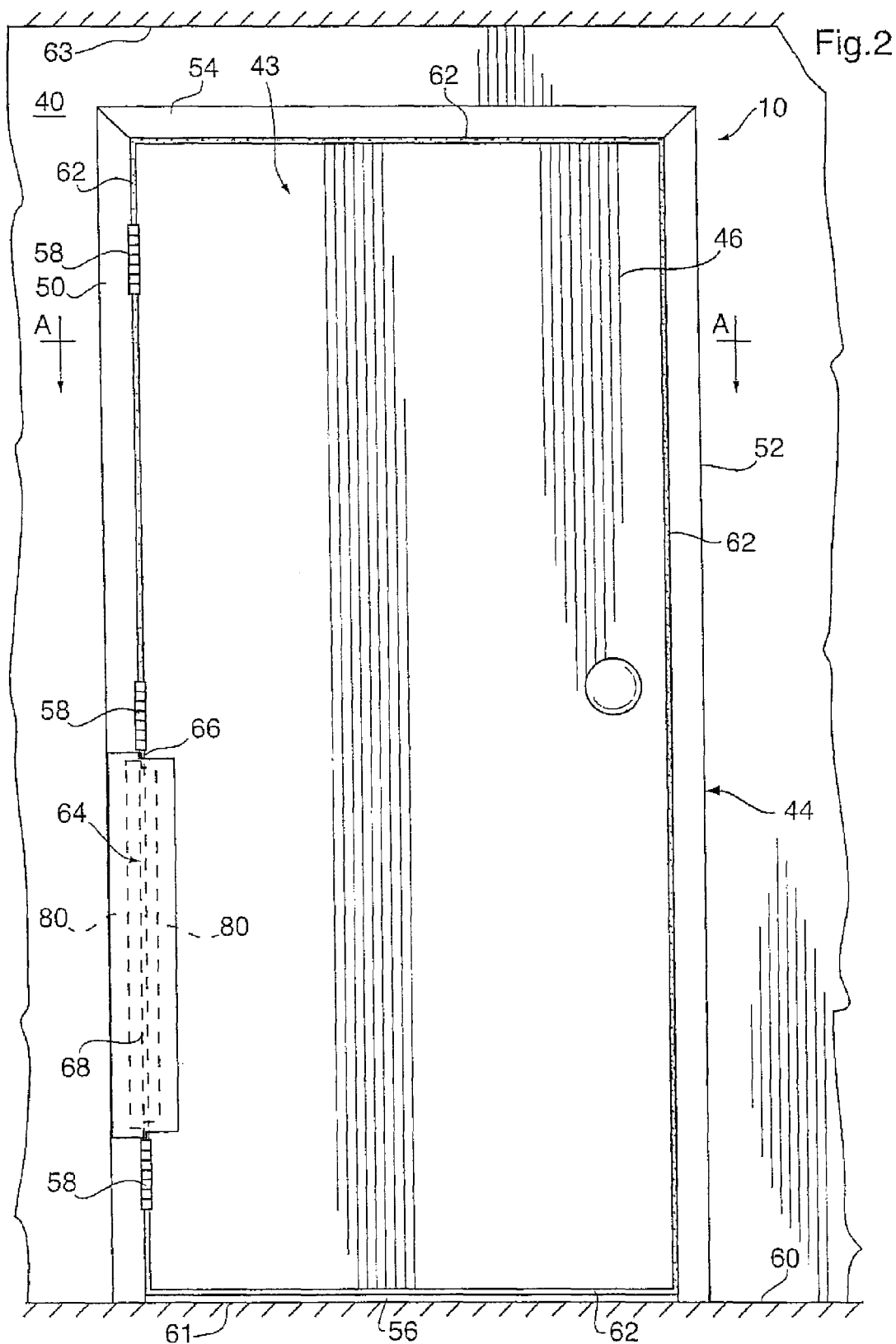
FIG. 2 is an elevation view of a wall-door system, showing the door in its closed position, according to the invention.

Referring to FIG. 2, a door frame 44 is attached to, or built into, a door opening 43. Preferably, door frame 44 is constructed from air barrier materials (e.g. steel or suitable wood) and in air barrier manner (e.g. sealed at all joints), so as to be substantially resistant to the flow air therethrough when subjected to a modest pressure differential on each side thereof. Door frame 44 is also preferably sealed to wall 40 to ensure that air cannot flow between wall 40 and door frame 44.

Door frame 44 at least comprises left and right side jambs 50 and 52, respectively, and head jamb 54. In addition, door frame 44 may have a sill or threshold 56 as the bottom member thereof, which will be located at or installed in the door threshold region 61 of floor 60. Preferably, any threshold 56 used will similarly be made of air barrier material (e.g. wood, steel or aluminum), so as to be substantially resistant to the flow air therethrough when subjected to a modest pressure differential on each side thereof, and sealed to the threshold region 61 of floor 60 to ensure that air cannot flow between threshold 56 and floor 60.

In some installations, there may be no sill or threshold, in which case the bottom of door 46 will be directly adjacent to the threshold region 61 of floor 60. The area beneath a door often defines a gap through which air flows.

Door 46 has two side edges and upper and lower edges and is generally sized to fit within the door frame 44. Along one side edge, door 46 is attached by hinges 58 to one of the door jambs, for example as illustrated to left door jamb 50. Preferably, door 46 is constructed from air barrier materials (e.g. steel, wood, plastic or fiberglass panels), so as to be substantially resistant to the flow air therethrough when subjected to a modest pressure differential on each side thereof.

Although door openings 43, door frames 44 and doors 46 are shown as being of conventional generally rectangular shape, other shapes could be used.

Door sealing structures, such as weatherstripping 62, for sealing door 46 to door frame 44, are installed around the edges of door 46. As best illustrated in FIG. 3, weatherstripping 62 is mounted between the edges of door 46 and door frame 44, whereby to substantially seal against air flow around door 46 when the door is closed. The weatherstripping 62 may be of any suitable type and may be mounted to either door 46 or frame 44 or, for certain types of weatherstripping, some components thereof may be mounted to door 46 and others to door frame 44. Depending on whether the door frame 44 includes a sill or threshold 56 and its design, the type of weatherstripping 62 along the lower edge of door 46 may be different than the type of weatherstripping 62 used along the side and upper edges of door 46. If there is a sill or threshold, the weatherstripping 62 along the lower edge of door 46 will be of a type which can substantially seal against air flow between such lower edge and the sill. If there is no sill or threshold, the weatherstripping 62 along the lower edge of door 46 will be of a type which can substantially seal against air flow directly against the threshold region 61 of floor 60 when the door is closed.

The combination of wall 40, door frame 44, door 46 and weatherstripping 62 as described above establishes a wall-door system substantially resistant to the flow air therethrough when subjected to a modest pressure differential thereacross.

In accordance with the invention, an air flow permitting opening 64 is provided in such wall-door system to allow air to flow one side of the wall-door system to the other when the door is closed and there is a pressure differential thereacross. More specifically, as shown in FIG. 2, an air flow permitting opening 64 is provided in an area along an edge of door 46. In particular, opening 64 comprises a portion of the gap 66 between door 46 and side jamb 50 where weatherstripping 62 is purposely removed or not installed along a pre-determined length. Preferably opening 64 will be along the edge of door 46 where hinges 58 are located. For any given width of gap 66, the length of opening 64 may be selected to provide an overall area of opening 64 sized to permit a controlled amount of airflow therethrough when there is a pre-determined pressure differential thereacross. For example, the pre-determined pressure differential may be the difference between a specified pressure $P_H$ in the common area 34 and a specified pressure $P_I$ in the interior of unit 32. Of course, as atmospheric, mechanical and building conditions change, the pressure differential across opening 64 will also change with resulting changes in the amount of air flowing therethrough.

Opening 64 will preferably comprise a single area in which there is no weatherstripping 52, for example located between two hinges. However, in some embodiments, it may be desirable to have two or more sections of gap 66 in which there is no weatherstripping 62 (for example, above and below a central hinge 58), which in total would allow an airflow equivalent to a single larger opening.

Air filter 68 is mounted in, or substantially extends across or covers, opening 64. Air filter 68 is made up of material which is adapted to substantially permit the flow of air therethrough while trapping particles that exceed a certain minimum size. For example, hammock filter sheet material sold by 3M Company under the trademark FILTRETE and described by 3M Company as a "micro particle & airborne allergen reduction" filter, has been found to be suitable for the present application. In the embodiment of FIGS. 2 to 5, filter 68 is a generally rectangular sheet of filter material removably attached to side jamb 50 and the side edge of door 46 in a sealed manner so as not to allow significant amounts of air to flow around the edges of filter 68. Preferably, the manner of attaching filter 68 to jamb 50 and door 46 will allow for convenient removal and cleaning or replacement of a soiled or damaged filter. Strips 80 of suitable adhesive or double-sided adhesive tape along the length or substantially all of the length of filter 68 may be used for such purpose.

Referring to FIGS. 4 and 5, filter 68 is shown in greater detail. Filter 68 comprises a generally rectangular sheet 71 of filter material with side edges 72 and 74 and upper and lower edges 76 and 78. Along each of edges 72 and 74, a strip 80 of adhesive or double-sided adhesive tape is applied along substantially the entire length of edges 72 and 74. In addition, adjacent upper and lower edges 76 and 78, additional cross-strips 82 of adhesive or double-sided adhesive tape may be applied.

The upper and lower edges 76 and 78 of filter 68 are cut to define attachment tabs 84, which will be bent, as explained below, out of the plane of filter 68. Tabs 84 are provided with adhesive or double-sided adhesive tape thereon. In view of the bending of attachment tabs 84, additional cross-strips 86 of adhesive or double-sided adhesive tape are attached to filter 68 near upper and lower edges 76 and 78. To ensure that cross-strips 82 and 86 and tabs 84 will provide a more robust attachment at the upper and lower sections of filter 68, the material of cross-strips 82 and 86 may comprise pieces of adhesive-backed neoprene or resilient weatherstripping material.

As shown in FIG. 5, filter 68 with attachment tabs 84 is attached to the front faces of door 46 and adjacent side jamb 50 by means of adhesive strips 80, 82 and 86. Upper and lower tabs 84 are wrapped around the edge of side jamb 50 essentially perpendicular to the front faces of door 46 and adjacent side jamb 50 and attached to a side face 51 of side jamb 50 by the adhesive of tabs 84. Filter 68 may also be reversed, so that tabs 84 are wrapped around a side edge of door 46.

In some embodiments, a filter 68 without attachment tabs 84 may be adequate for the purpose merely being held to door 46 and adjacent jamb 50 by adhesive strips 80.

Preferably, as noted above, opening 64 is located on the same side edge of door 46 as hinges 58. However, in other embodiments, openings in the weatherstripping could be provided at other suitable locations around the perimeter of door 46. In one such embodiment, as shown in FIG. 6, opening 64a is provided at gap 166 between door 46 and the non-hinge door jamb 52. In this case, opening 64a is covered by a piece of sheet of filter material 168 which is conveniently detachable on at least one side thereof to allow the opening and closing of the door 46. In this embodiment, filter 168 has a longitudinal strip 180 of adhesive or double-sided adhesive tape down one side thereof. In this case, the adhesive for strip 180 should bond relatively firmly to door 46 yet still be removable for cleaning or replacement of the filter. The other side of filter 168 is provided with a longitudinal strip 181 of a readily removable adhesive or other releasable attachment means, such as a hook-and-loop fastener for example as sold under the VELCRO brand.

In operation, when door 46 is closed and a pressure differential applied to the two sides of the wall-door system, filters 68 or 168, as the case may be, trap dust, dirt and other contaminants entrained in the air flowing through opening 64, thus preventing such dust, dirt and contaminants moving from a zone on one side of the wall-door system, such as a common area 34, to a zone on the other side, such as the interior of a unit 32.

In alternate embodiments, air flow openings to allow the appropriate amount of air flow across the wall-door system may be built into other components of such system. Various examples are shown in FIG. 7. As a first example, opening 64b may be designed into door 46 with a removable filter 68b installed in or over opening 64b. As a second example (shown in phantom), door frame 44 may be provided with an opening 64c in which a filter element 68c may be removably installed. As a third example (also shown in phantom), wall 40 itself may be provided with an opening 64d in which removable filter element 68d may be attached. In such embodiments, the filters may be, incorporated into a filter holding cartridge which may in turn be readily installed and removed from the openings.

As noted above, if door frame 44 has no sill or threshold, the weatherstripping 62 along the lower edge of door 46 will be of a type which can substantially seal against air flow directly against the threshold region 61 of floor 60 when the door is closed. Referring to FIG. 8, a further alternative embodiment is illustrated which may be used in case it is desired that a gap between the bottom of door 46 and the threshold region 61 of floor 60 be used as an airflow opening 64e. In such a case, there may be no, or only limited sections of, weatherstripping 62 between the bottom of door 46 and floor 60. The gap 64e is covered by filter structure 268, which in the illustrated embodiment extends across the width of door 46; that is, no weatherstripping is used between the bottom of door 46 and floor 60. Filter structure 268 comprises a base portion 270 attached to the bottom of door 46. In the illustrated embodiment, attachment is achieved by screws 272. Mounting slots 274 are provided in base portion 270 to allow for convenient height adjustment. Extending downwardly from base portion 270 is frame portion 276. Preferably, a lower edge of frame portion touches and sealingly engages floor 60. Frame portion 276 defines a frame opening 278 across which filter material 68e substantially extends. Preferably, filter material 68e is removably attached to filter frame 276 and in a sealed manner so as not to allow significant amounts of air to flow between the edges of filter material 68e and frame 276. Suitable adhesive or double-sided adhesive tape (not shown) around the edges of filter material 68e may be used for such purpose.

Referring to FIG. 9, an alternate manner of installing filter 68 is illustrated. In this case, filter 68 is folded whereby to allow adhesive or double-sided tape strips 80 to be attached to a side face 51 of jamb 50 and an edge face 47 of door 46. Although such installation may (because of the thickness and placing of the adhesive or double-sided tape strips 80) restrict the effective size of gap 66, such installation may be considered by some to be more aesthetically pleasing that the installation shown in FIG. 2 and thus preferred.

In an existing building, an occupant of a building with a substantially airtight wall 40 with a substantially airtight door frame 44 and a substantially airtight door 46 may achieve the benefits of the invention by implementing the following method. In one step, install weatherstripping between the edges of door 46 and door frame 44, except in a region along a side edge (preferably a hinge side edge) of door 46 thereby leaving an opening 64 when the door is closed. In another step, attach a filter 68 to door 46 and door frame 44 over opening 64. Preferably, the sides of filter 68 shall be sealingly attached to both door 46 and door frame 44. In another step, if the door frame has no threshold, install weatherstripping between a lower edge of door 46 and floor 60. In another step, if the door frame has no threshold and opening 64 is a gap between a bottom side of door 46 and floor 60, attach a filter structure 268 to door 46. In another step, if necessary, seal the door frame 44 to wall 40. In another step, if necessary, seal any threshold 56 to floor 60.

Although use of the invention has been illustrated in the particular context of a multi-level or high-rise building with multiple office or residential units, it will be appreciated that the invention may be used in any situation where it is desired to filter air moving around the edges of a closed door under the influence of a pressure differential between the two sides of the door.

An alternate embodiment of the invention is shown in FIGS. 10 through 21 and is designed for securement to the lower edge of a door to filter an air flow passing below the door when it is in the closed position.

Figure 10:
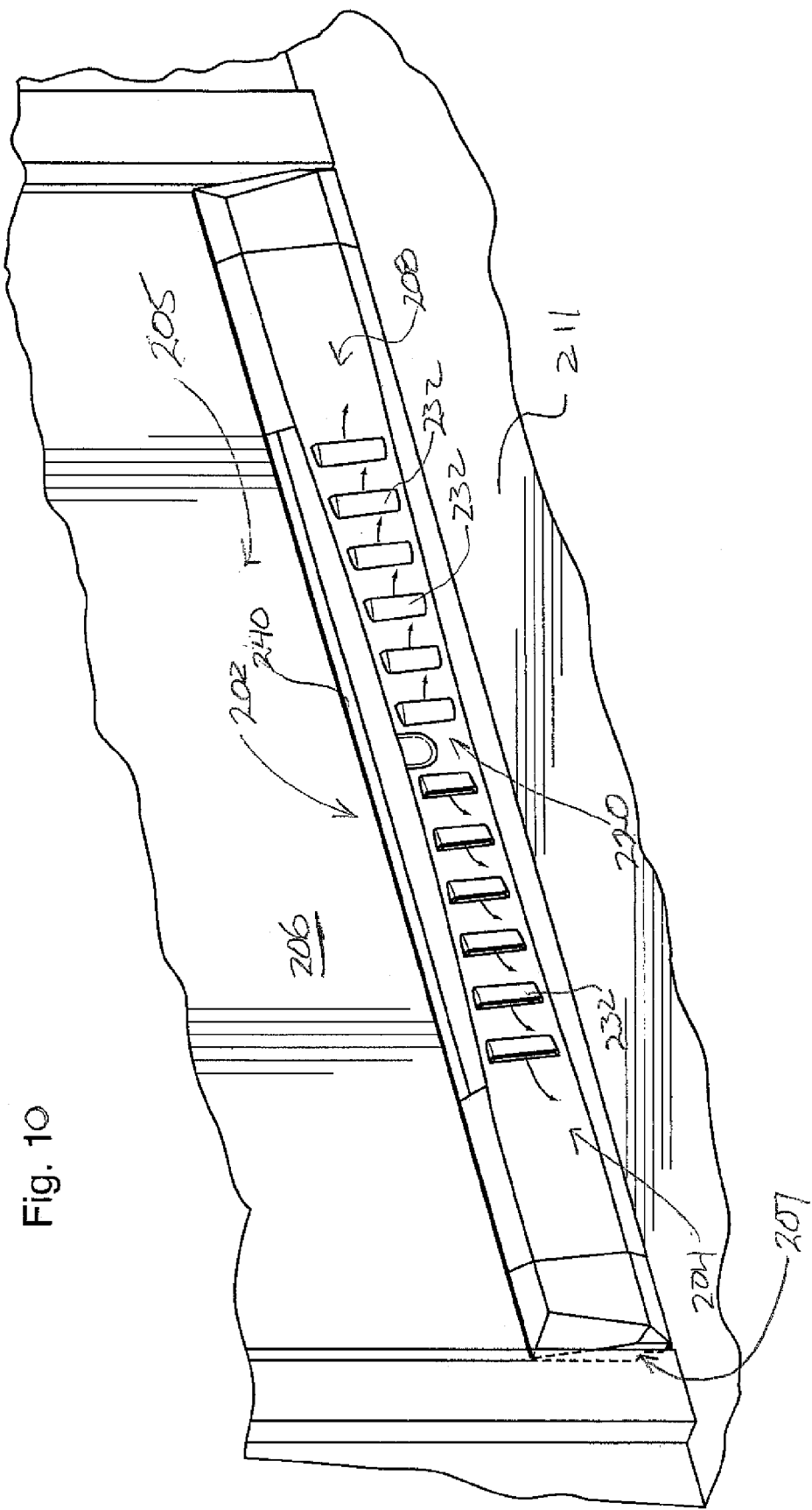
FIG. 10 is a partial perspective view showing an alternate embodiment having an air filter unit attached to a lower edge of a door.

The air filter unit 202 shown in FIG. 10 is secured on the inside surface of a door 205 adjacent a lower door edge 207. The planar face 206 of the door 205 is typically the inside face of an entry door to a condominium or office space, etc. The air filter unit 202 generally extends across the lower surface of the door preferably from side to side and also extends below the lower edge 207 of the door 206. Often there is a significant gap between the threshold or floor below the door 205 and the lower edge 207 of the door. Any pressure differential across the door will cause air to flow beneath the door through the air flow gap 209 (see FIG. 21). In multi-unit buildings, the hallway or common space to one side of the door 206 is often maintained at a higher air pressure and air flows beneath the door into the individual unit which is at a lower pressure. The air filter unit 202 provides an effective structure for filtering this air flow while allowing the door to function in its normal manner The air filter unit 202 includes an air blocking member indicated as 222 (see FIG. 13) that forms a deformable wiper type seal with the floor 211 or threshold. The purpose of the air blocking member 222 is to force air when the door is closed, which otherwise would pass freely under the door, to be redirected and filtered. The air is redirected upwardly between the planar face 206 of the door and rear face 210 of the air filter unit 202. The air passes through air filter 218 prior to discharge through air outlet 220. Preferably the air filter unit is made of a series of injection molded plastic parts.

By redirecting the air flow upwardly the thickness of the air filter unit 202 can be relatively narrow (preferably less than 1 inch thick) and as such does not protrude in a significant manner relative to the face of the door. This provides additional flexibility and additional area to allow for filtering as well as accommodating ease of replacement of the filtering element as will be subsequently discussed.

Figure 21:
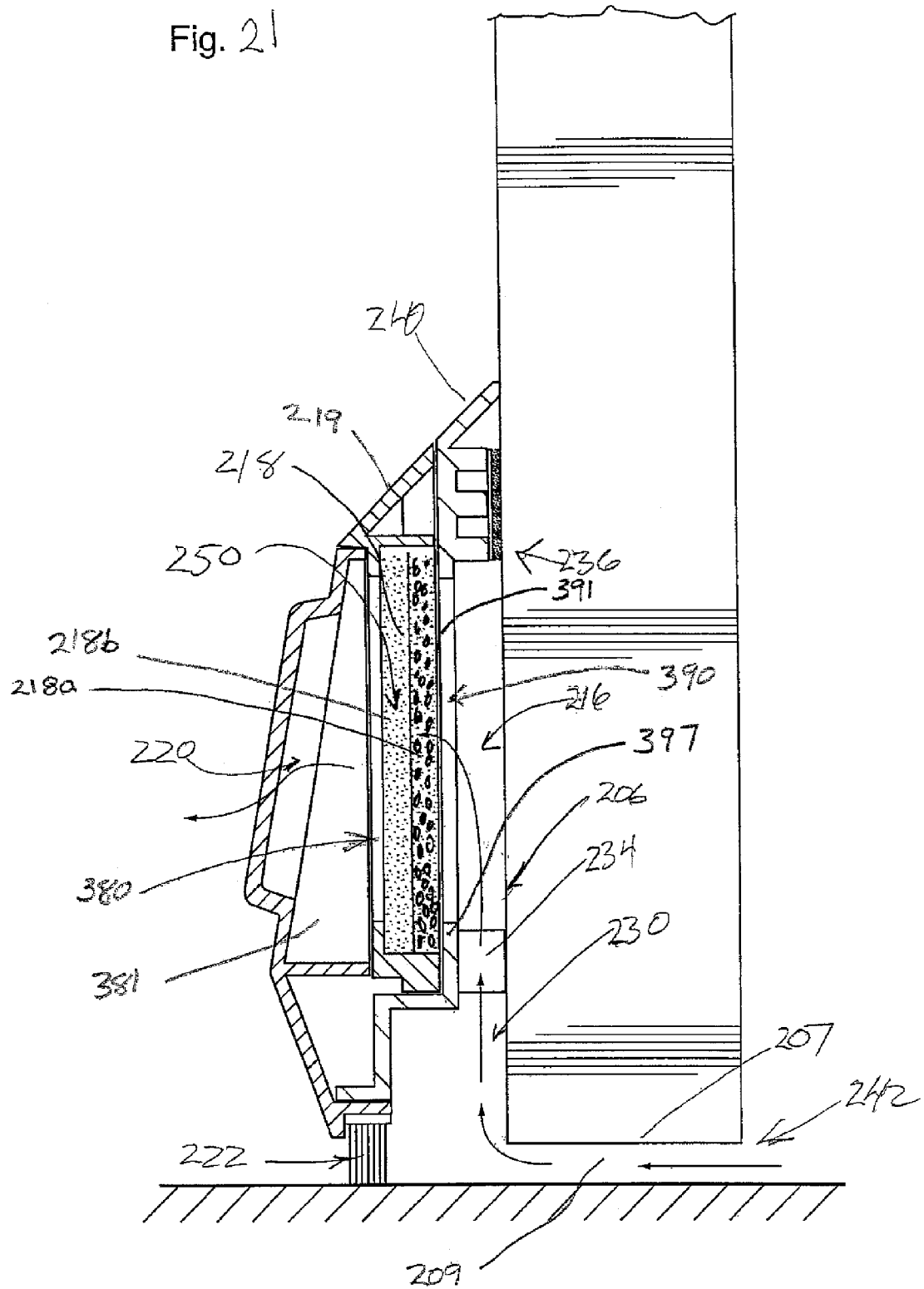
FIG. 21 is a sectional view showing the securement of the housing to a door and the redirection of an air flow upwardly through the air filter unit.

The sectional view of FIG. 21 includes an air flow 242 passing beneath the lower edge 207 of the door 205 and the air blocking member 222 extends downwardly from the elongate housing 204 of the air filter unit 202. The air flow is guided upwardly as indicated at 230 and then is free to pass through the air filter 218. Once clear of the air filter, the air flow is discharged through the air outlet generally indicated as 220. The air outlet 220 preferably has a series of angled louvers 232 which guide the discharged air across the front face of the air filter unit 202. These louvers partially visually hide the air filter 218 which is located behind the louvers.

As shown in the sectional view of FIG. 21, the rear face 210 of the air filter unit 202 includes standoff tabs 234 which engage the planar face 206 of the door 205. These standoff tabs 234 effectively space the air filter unit 202 from the planar face 206 and the distribution chamber 216 is formed between the planar face 206 and the air filter 218. The distribution chamber 216 is blocked at an upper edge indicated as 236 by a sealing arrangement and adhesive securement arrangement. The air filter unit 202 also includes the angled face 240 of the housing 204 that abuts the planar face 206.

The airflow 242 passes beneath the lower edge 207 of the door 205 and is then channeled and redirected upwardly into the distribution chamber 216. The air flow is then filtered by passing through the air filter 218 and is discharged through the various angled louvers 232. The gap beneath the lower edge 207 of the door is often narrow and this essentially defines an inlet size of the air filter unit 202. This can vary from door to door as well as from building to building. In some cases this gap may be predetermined and held in close tolerances as part of a building air management design function. The air filter unit 202 can be included as part of this functionality and need not be a user installed retrofit product. If the air filter unit is part of the door system additional integration is easily adopted.

The air outlet 220 of the filter unit 202 as shown in the drawings does not fully utilize the full extent of the front face 208. The portion of the front face 208 that is used for the outlet essentially corresponds to the area directly in front of the air filter member 218 and the size of the gaps defined by the louvers. It has been found that this outlet size is sufficient and it is desirable to have a significant portion of the front face without the louvers to increase the visual appeal by hiding the air filter member.

Preferably the air filter 218 is part of a replaceable air filter cartridge releasably received in the air filter pocket 250 formed within the housing 204. This pocket 250 has slightly inwardly angled side walls and inwardly angled front and back walls to automatically align and provide a tight fit of the air filter in the air filter pocket 250. The replaceable cartridge simplifies air filter replacement that is required from time to time depending upon the application and environment. The front face 208 of the housing 204 as shown in FIG. 10 includes a finger engaging recess 252 that allows the user to easily remove the air filter cartridge upwardly. The cooperating shapes of the cartridge and the tapering pocket provide self alignment that simplifies installation of a new cartridge and provides a tight fit of the cartridge in the pocket.

Figure 12:
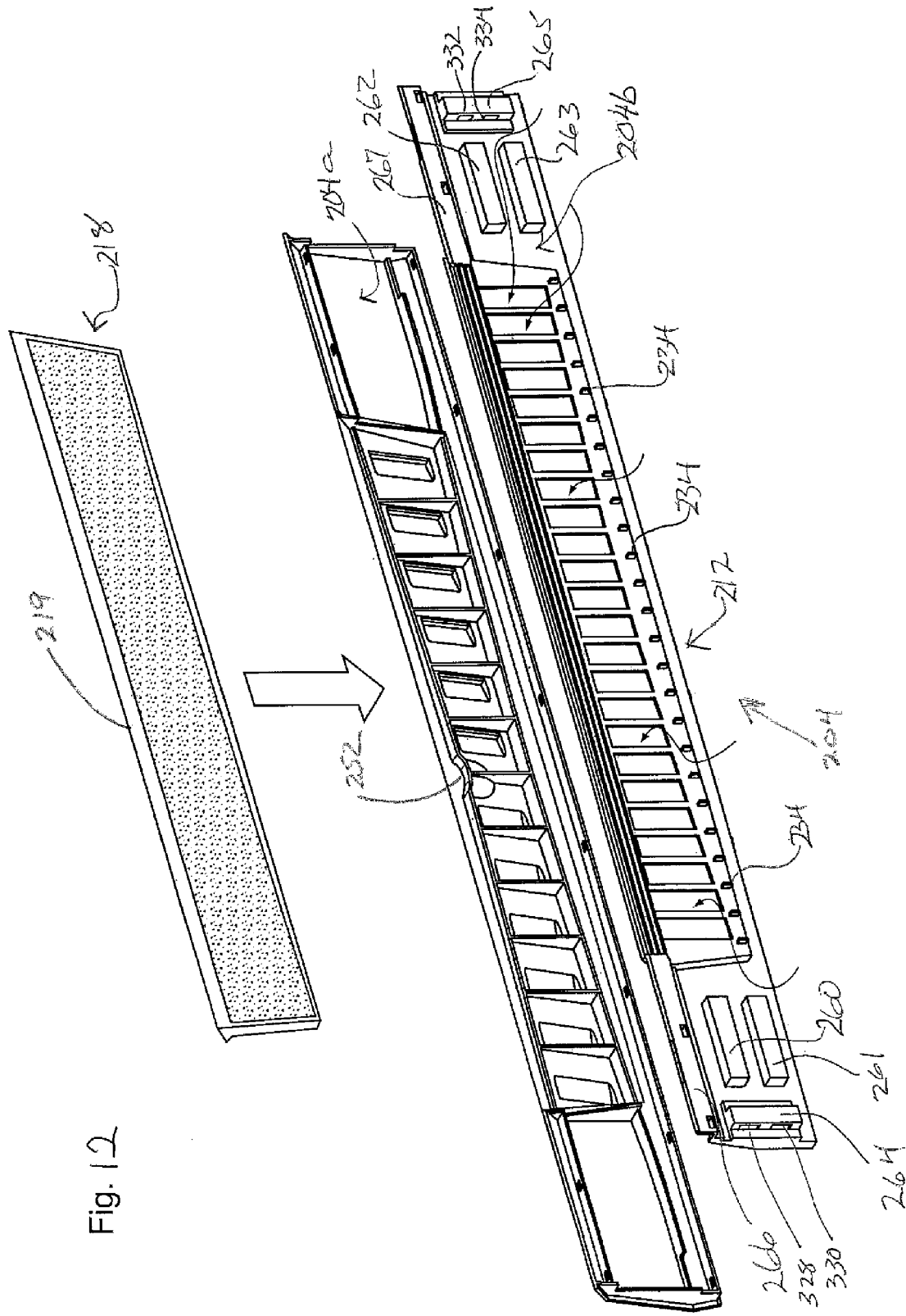
FIG. 12 is a partial exploded perspective view showing the two part housing in combination with a removable air filter cartridge.
Figure 13:
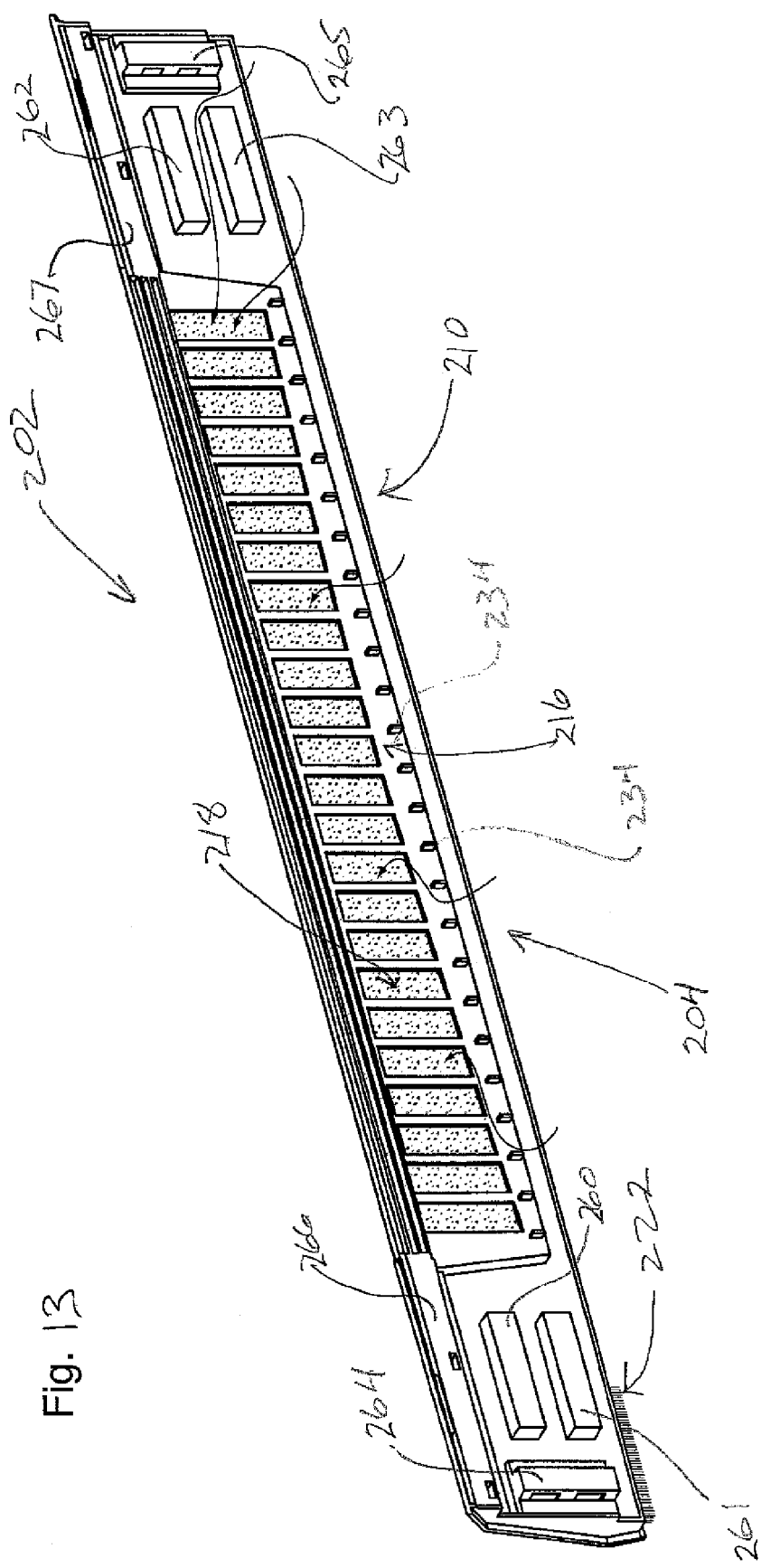
FIG. 13 illustrates the air filter unit with the air filter cartridge received in the housing.

The elongate housing 204 preferably includes a front housing 204a and a rear housing 204b. These components, as shown, preferably snap together and form a single housing. This two piece construction as shown in FIG. 12 simplifies the tooling for the housing. The pocket for the air filter cartridge 218 is essentially defined between the front housing and the rear housing when the housings are assembled. The two piece construction also stiffens the elongate housing and increases the durability of the structure.

The rear component 204b includes standoff blocks 260 and 261 at one end of the housing and standoff blocks 262 and 263 at the opposite end of the housing. These standoff blocks typically include an adhesive back peel type strip which when removed exposes a pressure sensitive adhesive used to secure the air filter unit 202 to the planar face 206. In addition the housing 204 includes connecting standoff blocks 264 and 265. These connecting standoff blocks also include an adhesive type securement for engaging and securing the structure to a door however they also provide a mechanical connection with one of a series of end caps. The end caps are of different lengths to allow an end user to adjust the length of the air filter structure for the width of the door. The rear housing component 204b also includes securing faces 266 and 267 at opposite ends of the housing which can include the pressure type adhesive tape securement. Complete sealing of the sides and top surface of the air filter structure to the door is preferably but is not essential. It is desirable to direct the air flow through the air filter unit but some leakage thereabout may occur. As shown, the air distribution chamber 216 is oversized relative to the air filter cartridge 218 and air is channeled to the air filter cartridge. The air distribution chamber 216 extends above the level of the air outlet and is closed at the upper edge by the angled face 240 of the housing 204. The upper edge 219 of the air filter cartridge can also partially close the air distribution channel.

Preferably the adhesive type securement is a two sided adhesive tape with one side secured to the air filter unit and the other side remaining covered until secured to a door.

It has been found that entry doors for condominiums, office spaces and other multi-unit complexes are not of a single width. Typically these doors correspond to one of several accepted standards such as 30, 32 and 34 inch wide doors. It is possible to manufacture air filter units for each of these widths, however this requires each retailer to stock three different products. Either arrangement can be used.

The structure shown in FIG. 14 includes three or more pairs of end caps 302, 304 and 306 of different sizes that, when secured to the housing, allow the air filter unit with an appropriate pair of end caps to extend across the lower edge of a door. The user selects the appropriate pair of end caps to fit the width of the given door and manually connects the end caps to the housing. The remaining end caps are not used. The user completes the assembly. Each end cap includes its own floor engaging seal member and pressure sensitive securement tape. In this way the user assembles the components and appropriate seals and securement tape is provided.

Each of the end caps 302, 304 and 306 are of the same structure with the only significant difference being the length thereof. The actual length of the end caps is based on fitting one of a number of standard doors when connected to the housing 205. The push on manual connection includes a pair of spring fingers 308 and 310 that are received in securing ports 328 and 330 of standoff block 264 or in securing ports 332 and 334 of standoff block 265. The spring fingers 308 and 310 include tapered ends 309 and 311 that assist in initial insertion in the securing ports and force the spring fingers inwardly. Once fully inserted the fingers spring outwardly and are held in place by latches 313 and 315.

Each pair of end caps forms a right end cap and a left end cap. These end caps preferably have a front component 410 and a snap in rear component 412. This two piece construction adds strength and simplifies individual tooling. Variations of this construction may be made. It can also be appreciated it can be made as a single length housing without removal of the end caps.

Figure 18:
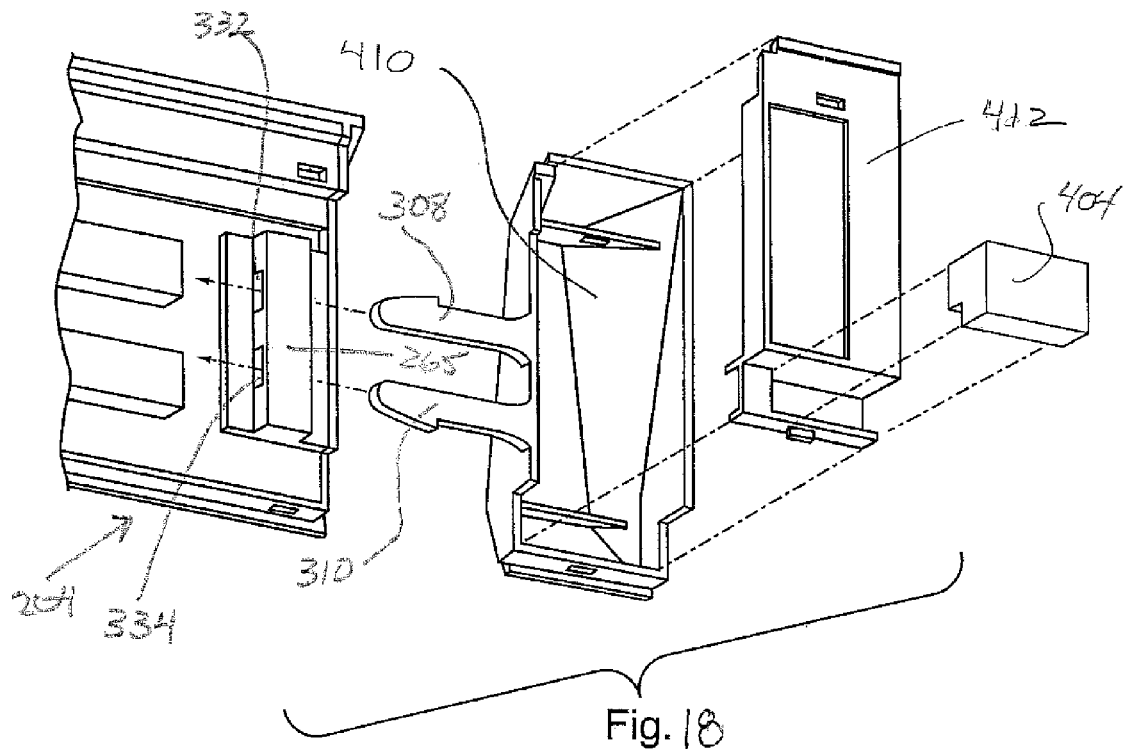
FIG. 18 is an exploded partial rear view showing the attachment of an end cap to the housing as well as a two part construction of the end cap.
Figure 19:
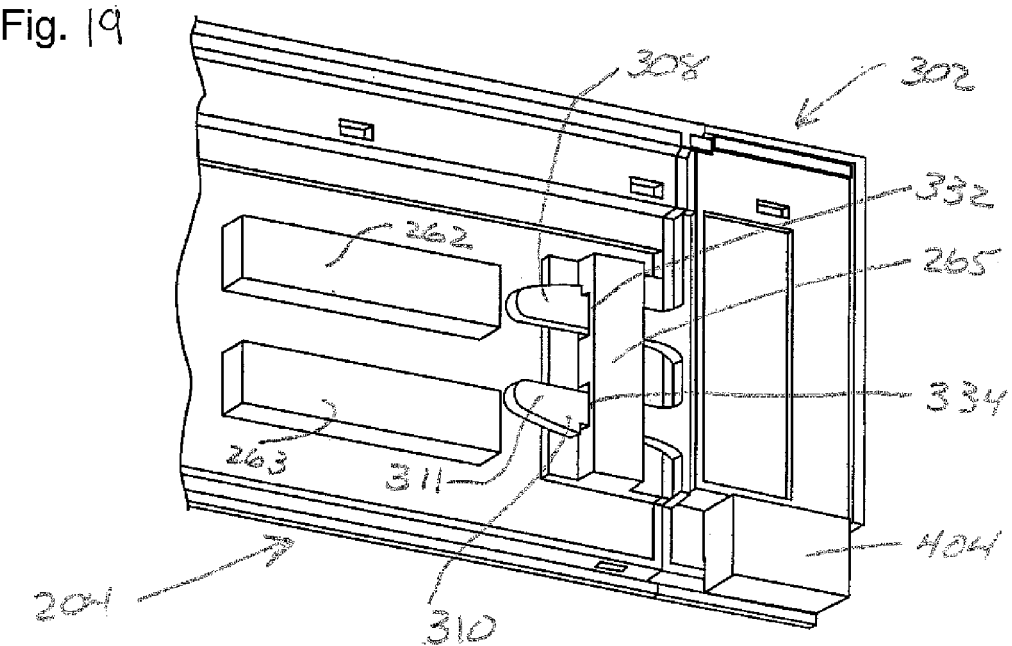
FIG. 19 is a partial rear view with an end cap secured to the housing.
Figure 20:
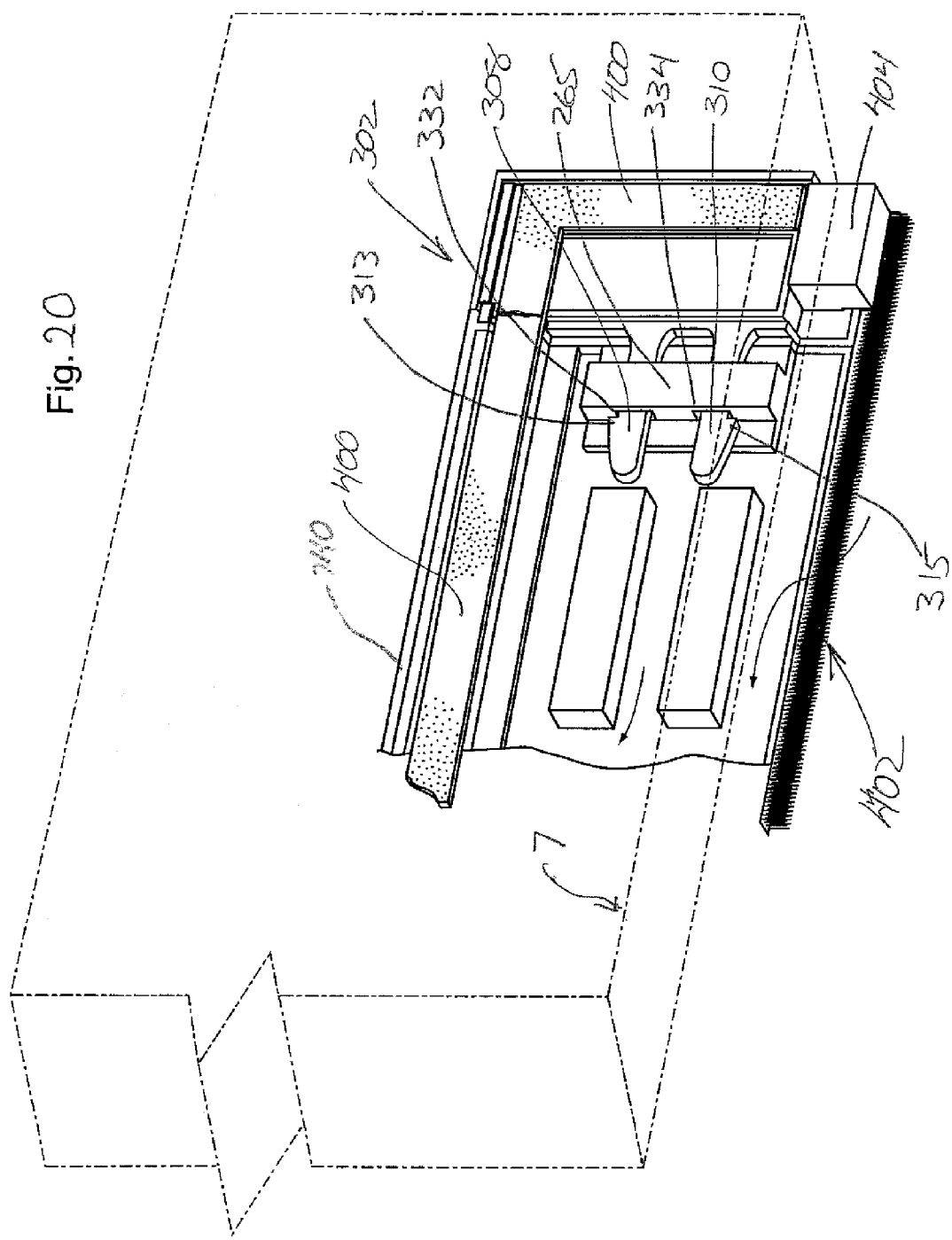
FIG. 20 is a partial perspective view showing the air filter unit with a bottom edge air blocking member in combination with a sealing arrangement about the periphery of the housing.

Once the appropriate end caps have been secured to the housing as generally shown in FIGS. 14, 18 and 19, the user secures the filter unit to the door 205. Preferably this is accomplished by removing release paper used to protect a two sided pressure sensitive adhesive tape 400 (shown in FIG. 20). The air filter unit is preferably adhesively secured to the lower edge of the door and located to provide the wiper type seal 402 with the floor or threshold when the door is in the closed position. The end cap 302 shown in FIG. 20 includes a compressible foam member 404 that forms an air block at an end of the air distribution chamber. The compressible foam member 404 deforms as necessary to resiliently engage the surface of a threshold (if present) that projects outwardly below the door. In this way the air filter unit automatically cooperates with different types of thresholds if present and substantially closes the ends of the air distribution chamber reducing air leakage past the air filter unit.

The air filter unit 202 is preferably secured to the interior surface of an entry door without any mechanical type securement that relies on piercing of the surface of the door. Pressure adhesive securement functions very effectively and does not compromise the physical properties of the door such as the fire rating thereof. In addition the adhesive securement of the air filter unit will comply with most condominium type building regulations.

The air filter cartridge filters dirt and dust from the air that is passing below the lower edge of the door, however the filter can also include a further carbon layer to assist in removal of odours. An activated carbon containing layer 218a is shown in FIG. 21 attached to a conventional air filtering fiber layer 218b. The activated carbon layer can be an activated carbon associated with a polyether polyurethane foam carrier. Typically each layer is 3 to 8 mm thick. This type of material is readily available from a number of suppliers. The filter material is shown as two separate layers for purposes of explanation and is commercially available, however integration of the layers is also possible.

Filtering and/or the reduction of transient odors is particularly helpful in condominium applications. It has been found that the cartridge will typically operate for at least two to five months before it requires replacement. The replacement period is a function of the environment and the amount of material that is being separated by the air filter element. An electronic countdown timer may be provided that activates an audio or visual alert. This countdown timer will activate the alert based on an elapsed time to indicate that replacement of the air filter cartridge should be considered. The timer preferably automatically resets after maintaining the alert for a limited time period. A user reset actuator could also be provided if desired. The countdown timer is preferably mounted in the air filter housing. Such a countdown timer is schematically shown as 450 in FIG. 14 with indicator 452. As an alternative, a countdown timer can be associated with the cartridge (preferably on the upper edge thereof) and activated when the cartridge is first inserted in the housing.

Figure 11:
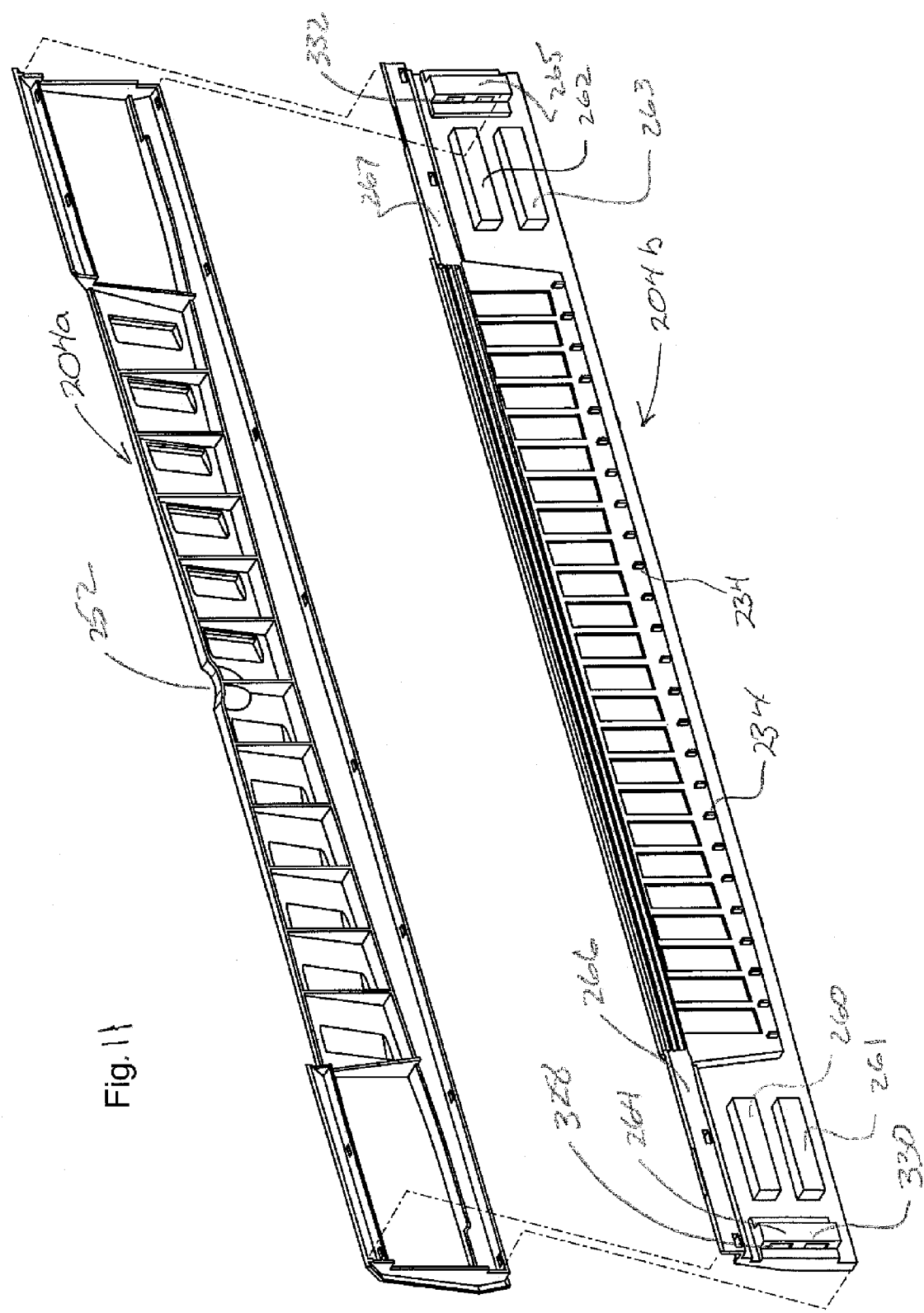
FIG. 11 is an exploded perspective view showing two separate housing components that connect together to form a housing of the air filter unit.

The front face 380 of the pocket 250 is part of the front housing 204a and includes struts 381 (see FIGS. 21 and 11). The rear face 390 of the pocket 250 is part of the rear housing 204b and includes braces 391. Struts 381 align with every second brace 391 with an additional brace located midway between struts. These struts and braces strengthen the pocket and also engage the cartridge at spaced intervals along its length. With this arrangement the cartridge is engaged in a host of distributed positions. The rear face of the pocket also includes side faces 393 and 395 that overlap with and partially compress the air filter material of the cartridge. There is also this type of overlap at the bottom face 397.

The air filter cartridge preferably includes its own upper angled surface 300 which is oversized and essentially suspends the air cartridge from a top edge. With this arrangement the air filter generally hangs in the pocket 250. The hanging of the cartridge in the air filter pocket 250 reduces possible vibration of the air filter cartridge in the tapered pocket and also provides an improved fit of the exposed upper surface of the cartridge with the air filter housing. From a functional point of view, other arrangements can be used, however the present arrangement provides a desirable fit of the cartridge with the pocket reducing visually obtrusive tolerance gaps.

The air filter unit includes various standoffs at the rear surface of the housing that positively support the air filter unit with respect to forces applied to the front face 208 of the housing 204. The two piece construction of the housing strengthens the housing and also maintains a spacing of the housing away from the planar face 206 of the door 205. In this way the air distribution chamber is open and does not substantially restrict the air flow as it is channeled to pass through the air filter.

The air distribution channel as shown is open to the planar face of the door. In an alternate arrangement the distribution channel is closed on this face by its own back wall structure. In this alternate arrangement the double sided tape is at least partially provided on this back wall and acts as the securement arrangement. With this alternate arrangement the channeling and redirecting of air after it passes under the door is more easily controlled against leakage.

It is preferred that the height of the air filter unit is similar to a height of a baseboard. Being similar to a base board, the air filter unit visually joins the elongate baseboard either side of the door. Such an extension assists in the air filter unit blending with the entry door and its environment.

The replaceable filter cartridge has an elongate peripheral frame that receives and secures the filter material. The opposed end walls of the peripheral frame are angled downwardly and inwardly (preferably at an angle of about 15 degrees) to cooperate with a similarly shaped pocket for cartridge alignment. The series of spaced struts distributed in the length of the cartridge connect top and bottom members of the peripheral frame. A series of air passage zones are located between adjacent struts.

The door filter cartridge is elongate and preferably of a length in the range of 16 to 20 inches with a height in the range of 2 to 4 inches. The top member of the peripheral frame includes an outwardly projecting support flange that aligns and supports the cartridge in the pocket of the air filter housing.

The provision of the air filter housing on the inside surface of the door that redirects the airflow passing under the door upwardly, shifts the filtering function away from the door gap where space is limited. Additional area is provided by the preferred air filter unit to filter the air flow without materially projecting into the space adjacent the door entry.

The air filter unit as disclosed is attachable to a lower edge of a door and filters air that passes under the door. It is desirable, particularly for condominium applications, to secure the air filter unit to an inside face of the door. It is also possible to secure the air filter unit to an outside face of the door. In this embodiment the air outlet and air inlet reverse their function. Such a reverse installation may be desirable for specific applications or sites.

Although various preferred embodiments of the present invention have been described herein in detail, it will be appreciated by those skilled in the art that variations may be made thereto without departing from the claimed invention.

The invention claimed is:

1. An air filter system for a door system separating first and second air pressure zones; said door system including a door frame having an air flow barrier door generally sized to fit within and hinged to the door frame, the door having two side edges and upper and lower edges with an air flow permitting region between the lower edge of the door and a door threshold when the door is closed; and wherein said air filter system includes an air filter housing attached to and extending downwardly below the lower edge of the door; said air filter housing including an air inlet adjacent the lower edge of the door and an air outlet spaced outwardly to one side of the door with an air filter member separating said air inlet from said air outlet to filter air passing through said air inlet to said air outlet.

2. An air filter system as claimed in claim 1 wherein said air permitting region has an opening with an area that is significantly smaller than an initial filtering face of said filter member.

3. An air filter system as claimed in claim 1 wherein said air filter housing extends downwardly from an inside face of the door and includes a floor engaging seal along a lower edge thereof.

4. An air filter system as claimed in claim 1 wherein said air filter housing extends across the width of the door and is adhesively attached to an inside face of the door.

5. An air filter system as claimed in claim 1 wherein said filter member is removably received in said air filter housing.

6. An air filter for filtering air flowing through a gap between a lower edge of a door and a door floor region, the air filter comprising a base portion and a frame portion, the base portion being attachable to the lower edge of the door with the frame portion extending downwardly to substantially extend across the gap and seal with said floor region, the frame portion having a frame opening, and air filter material substantially extending across the frame opening.

7. An air filter as claimed in claim 6 wherein the base portion has door attachment means for attaching the base portion to an inside face of the door.

8. An air filter as claimed in claim 7 wherein the air filter material is a removable air filter cartridge.

9. An air filter unit comprising an elongate housing having a front and rear face with said housing being securable to a planar face of a door; said rear face of said housing including an air inlet portion extending below a bottom edge of the door to receive and redirect air passing below said bottom edge; said housing including an upwardly extending distribution chamber at least partially overlapped with said planar face and connecting said air inlet portion to an air outlet portion; and further including an air filter separating said distribution chamber from said air outlet portion whereby air passing from said air inlet portion to said distribution chamber and out said air outlet portion passes through said air filter.

10. An air filter unit as claimed in claim 9 wherein said housing extends across the bottom edge of the door.

11. An air filter unit as claimed in claim 9 wherein said air filter is a removable air filter cartridge and said housing includes a pocket for receiving and retaining said air filter cartridge.

12. An air filter unit as claimed in claim 11 wherein said air filter cartridge is upwardly removable from said housing.

13. An air filter unit as claimed in claim 11 wherein said air distribution chamber is oversized relative to a net filtering surface of said air filter.

14. An air filter unit comprising a housing securable to a lower edge of a door with said housing having a front face, a rear face and a bottom edge including a floor engaging air block member; an air filter retained in said housing and separating an air inlet located adjacent a lower edge of said rear face and an air outlet in said front face; said air inlet cooperating with said housing and said floor engaging air blocking member to define an air distribution channel that directs air passing through said air inlet upwardly past said air blocking member through said air filter and subsequently discharged from said housing through said air outlet.

15. An air filter unit as claimed in claim 14 wherein said air filter is a removable air filter cartridge releasably secured in said housing.

16. An air filter unit as claimed in claim 15 wherein said housing includes an upwardly opening pocket sized to tightly receive said air filter cartridge at the ends and at front and rear faces of the air filter cartridge.

17. An air filter unit as claimed in claim 14 wherein said elongate housing includes a replaceable end cap at each end of said housing, mechanically secured to said housing.

18. An air filter unit as claimed in claim 17 including as part of a kit at least two additional end caps of a greater length than said replaceable end caps allowing said additional end caps being interchangeable with said replaceable end caps whereby the length of said air filter unit may be varied.

19. An air filter unit as claimed in claim 15 wherein said air distribution channel is closed on one side by a planar face of a door when it is attached thereto.

20. An air filter unit as claimed in claim 15 wherein said air distribution channel extends upwardly above said air outlet and is closed by a forwardly angled upper face of said housing.

21. A door air filter cartridge comprising an elongate peripheral frame securing an air filter material within said peripheral frame; and wherein said peripheral frame includes opposed end walls angled downwardly and inwardly.

22. A door air filter cartridge as claimed in claim 21 wherein said peripheral frame on one face thereof includes a series of spaced struts distributed in the length of the cartridge with air passage zones therebetween, said struts connecting a top member and a bottom member of said peripheral frame.

23. A door air filter cartridge as claimed in claim 22 wherein said cartridge has a length in the range of 16 and 20 inches and has a height in the range of 2 to 4 inches.

24. A door air filter cartridge as claimed in claim 22 wherein said top member of said peripheral frame along the length thereof includes an outwardly projecting support flange.

\* \* \* \* \*